US012038302B2

(12) United States Patent
Sundia et al.

(10) Patent No.: US 12,038,302 B2
(45) Date of Patent: Jul. 16, 2024

(54) PERSONNEL LOCATION MONITORING

(71) Applicant: Rowan Companies. Inc., Houston, TX (US)

(72) Inventors: Agung Atus Sundia, Katy, TX (US); Richard Norton, Houston, TX (US)

(73) Assignee: Rowan Companies, Inc., Houston, TX (US)

(*) Notice: Subject to any disclaimer, the term of this patent is extended or adjusted under 35 U.S.C. 154(b) by 0 days.

(21) Appl. No.: 18/143,388

(22) Filed: May 4, 2023

(65) Prior Publication Data

US 2023/0274112 A1 Aug. 31, 2023

Related U.S. Application Data

(63) Continuation of application No. 16/390,203, filed on Apr. 22, 2019, now Pat. No. 11,763,111, which is a
(Continued)

(51) Int. Cl.
*G01C 21/00* (2006.01)
*G01S 5/02* (2010.01)
(Continued)

(52) U.S. Cl.
CPC ..... *G01C 21/3804* (2020.08); *G01C 21/3848* (2020.08); *G01S 5/02521* (2020.05);
(Continued)

(58) Field of Classification Search
CPC ........... G06K 7/10425; G06K 7/10396; G06K 17/0022; G01S 5/02521; G05B 19/0428;
(Continued)

(56) References Cited

U.S. PATENT DOCUMENTS 4,722,574 A * 2/1988 Barham ................ E21D 23/148
340/565
6,825,763 B2 11/2004 Ulrich et al.
(Continued)

FOREIGN PATENT DOCUMENTS

AU   2015200877   3/2015
CN   101661094    8/2008
(Continued)

OTHER PUBLICATIONS

Extronics, "iCAM100 Compqct Fixed Focus CCTV Camera," Brochure, copyright 2016, 2 pgs.
(Continued)

*Primary Examiner* — Thomas Randazzo
(74) *Attorney, Agent, or Firm* — Fletcher Yoder, P.C.

(57) ABSTRACT

A method, system, and computer readable medium configured to store instructions executable by a processor to identify personnel locations and/or conflicts between personnel and movable machines. The method includes creating, in a database, a dimensional map of an offshore unit, tracking, in the database, locations of the entities in the dimensional map of the offshore unit by receiving at least wireless monitoring from wireless devices associated with both the entities and the offshore unit, obtaining, with a programmable control device, operating parameters of a movable machine operating on the offshore unit, calculating, with the programmable control device, a dynamic movement zone that changes by moving dynamically in the dimensional map in the database based on the operating parameters of the movable machine, detecting, with the programmable control device, a conflict of at least one of the tracked locations interfering with the dynamic movement zone of the movable machine, and outputting the detected conflict with the programmable control device.

20 Claims, 12 Drawing Sheets

Related U.S. Application Data continuation-in-part of application No. 15/971,028, filed on May 4, 2018, now Pat. No. 10,654,692.

(51) Int. Cl.
| | |
|---|---|
| *G05B 19/042* | (2006.01) |
| *G06K 7/10* | (2006.01) |
| *G06K 17/00* | (2006.01) |
| *G08B 21/02* | (2006.01) |
| *H04W 4/029* | (2018.01) |

(52) U.S. Cl.
CPC ..... *G05B 19/0428* (2013.01); *G06K 7/10396* (2013.01); *G06K 7/10425* (2013.01); *G06K 17/0022* (2013.01); *G08B 21/0272* (2013.01); *G08B 21/0275* (2013.01); *H04W 4/029* (2018.02)

(58) Field of Classification Search
CPC .............. G08B 21/0272; G08B 21/0275; H04W 4/029
See application file for complete search history.

(56) References Cited

U.S. PATENT DOCUMENTS

| | | | |
|---|---|---|---|
| 7,916,024 | B2 | 3/2011 | Gennard |
| 9,693,181 | B1* | 6/2017 | Albouyeh ............... H04N 7/183 |
| 10,654,692 | B2* | 5/2020 | Norton ..................... E21B 47/13 |
| 2005/0200453 | A1* | 9/2005 | Turner ................... G07C 9/257 |
| | | | 340/10.41 |
| 2006/0232405 | A1* | 10/2006 | Filibeck ................... G07C 9/28 |
| | | | 340/8.1 |
| 2008/0030359 | A1* | 2/2008 | Smith ...................... G07C 9/28 |
| | | | 340/686.1 |
| 2008/0129467 | A1* | 6/2008 | Gennard ............ G08B 13/2454 |
| | | | 340/286.11 |
| 2010/0089855 | A1 | 5/2010 | Kjoiseth |
| 2011/0309931 | A1 | 12/2011 | Rose |
| 2012/0074759 | A1* | 3/2012 | Weigel .................... E21C 35/04 |
| | | | 299/1.6 |
| 2012/0130632 | A1 | 5/2012 | Bandyopadhyay et al. |
| 2013/0299440 | A1* | 11/2013 | Hermann .............. B66C 15/065 |
| | | | 340/8.1 |
| 2014/0035726 | A1* | 2/2014 | Schoner ................ H04W 64/00 |
| | | | 340/8.1 |
| 2014/0340220 | A1* | 11/2014 | Meraz .................. G08B 26/008 |
| | | | 340/539.13 |
| 2015/0049911 | A1* | 2/2015 | Doettling ............... G08B 21/22 |
| | | | 382/103 |
| 2015/0133748 | A1 | 5/2015 | Edmonds et al. |
| 2015/0248824 | A1* | 9/2015 | Kamalakannan .... G06Q 90/205 |
| | | | 340/539.13 |
| 2017/0154341 | A1* | 6/2017 | Gilbertson ............. G06F 21/35 |
| 2017/0228949 | A1* | 8/2017 | Trani ..................... G07C 9/253 |
| 2017/0302741 | A1* | 10/2017 | Conner .................. G08B 25/08 |
| 2018/0082560 | A1* | 3/2018 | Gillum .................. G01S 5/0231 |
| 2018/0184255 | A1* | 6/2018 | Marson .................. H04W 12/64 |
| 2019/0122084 | A1* | 4/2019 | Austin ................... G06Q 30/06 |
| 2019/0142305 | A1* | 5/2019 | Tan .................... G08B 21/0272 |
| | | | 600/595 |
| 2019/0228630 | A1* | 7/2019 | Gillum .................. G01S 5/0036 |
| 2019/0257471 | A1* | 8/2019 | Casagrande ....... F16M 11/2014 |
| 2019/0301888 | A1* | 10/2019 | Gürel ................... G01C 21/3611 |
| 2020/0073363 | A1* | 3/2020 | Albrecht ................ H04W 4/70 |
| 2020/0074228 | A1* | 3/2020 | Francis .................. G06V 10/28 |
| 2020/0160682 | A1* | 5/2020 | Johnson ................. F16P 3/147 |
| 2020/0285977 | A1* | 9/2020 | Brebner .................. G01K 3/10 |
| 2020/0320842 | A1* | 10/2020 | Wang ..................... H04W 4/90 |

FOREIGN PATENT DOCUMENTS

| | | | |
|---|---|---|---|
| WO | 2013033780 | 3/2013 | |
| WO | 2017114846 | 7/2017 | |
| WO | WO-2017114846 A1 * | 7/2017 | ......... G06K 9/00201 |

OTHER PUBLICATIONS

Extronics, "Wireless Technologies Take Personnel Safely in the Process Industries to a New Level," dated Oct. 2010, 7 pgs.
Extronics, "iVID101 Explosion Proof Video Monitor," Brochure, copyright 2016, 2 pgs.
Extronics, "iRFID100 Fixed Zone 1 UHF RFID Reader," Brochure, copyright 2016, 2 pgs.
Extronics, "iTAG100 Intrinsically Safe Tag," Brochure, copyright 2016, 4 pgs.
Extronics, "iTAG101 Tag Exciter," Brochure, copyright 2016, 3 pgs.
Extronics, "Extronics Advance," Product Catalogue, dated May 25, 2017, 32 pgs.
Extronics, "Hardware Manager," Brochure, copyright 2015, 1 pg.
Extroncis, "MobileView Enterprise Visibility Software," Brochure, copyright 2016, 3 pgs.
Extronics, "Instant Notifier v1.5," Brochure, copyright 2016, 2 pgs.
Extronics, "T2 Wi-Fi Active RFID Tag," Brochure, copyright 2016, 2 pgs.
Extronics, "T2-EB Wi-Fi Active RFID Tab," Brochure, copyright 2016, 2 pgs.
Extronics, "T3 Wi-Fi Active RFID Tab," Brochure, copyright 2016, 2 pgs.
Extronics, "EX3210 Tax Exciter," Brochure, copyright, 2 pgs.
Extronics, "Tag & Exciter Detector (TED)," Brochure, copyright 2016, 2 pgs.
Extronics, "T2L Wi-Fi Active RFID Tag," Brochure, copyright 2016, 2 pgs.
Extronics, "T14 Bi-Directional Worker Badge," Brochure, copyright 2016, 2 pgs.
Extronics, "T2s Small Form Factor Tag," Brochure, copyright 2016, 2 pgs.
Extronics, "EX5210R Rugged Long Range Outdoor Tag Exciter," Brochure, copyright 2019, 2 pgs.
OMNI-ID LTD, "Omni-ID(R)" Brochure, copyright 2016, 2 pgs.
Extronics, "Evaluation Development Kit," Brochure, copyright 2018, 3 pgs.
Extronics, "Personnel & Asset Tracking," Brochure, obtained from www.extronics.com, dated Mar. 2012.
Accuware, "Accuware Bluetooth Beacon Tracker," Fact Sheet, obtained from www.accuware.com, copyright 2017.
Accuware, "Accuware Sentinel," Fact Sheet, obtained from www.accuware.com, copyright 2017.
Accuware, "Accuware Wi-Fi Locations Monitor," Fact Sheet, obtained from www.accuware.com, copyright 2015.
Offshore, "Aramco Claims World First for Offshore Personnel Tracking," obtained from www.offshore-mag.com, dated Mar. 14, 2016.
Gao, "RFID Personnel Tracking System," obtained from http://gaorfid.com/people-locating-rfid-system/, updated, downloaded on Feb. 28, 2018.
Aanderaa Data Instruments AS, "MIPEG Crane Safety and Monitoring Systems," brochure, dated Apr. 2013.
Ritchie, M., "Automated Personnel on Board Muster System (Automated Emergency Roll Call)," White Paper, Marine Rescue Technologies, dated Apr. 19, 2010.
Identec Solutions, "Watcherpersonnel: Visibility of Onshore and Offshore Operations Delivers Safety and Productivity," obtained from https:/www.identecsolutions.com/oil-gas-industry-solutions/watcher-personnel-people-tracking/, updated, downloaded on Feb. 28, 2018.

* cited by examiner

PERSONNEL LOCATION MONITORING

CROSS-REFERENCE TO RELATED APPLICATIONS

The present application is a continuation of U.S. application Ser. No. 16/390,203, entitled "System and Method for Locating Personnel at Muster Station on Offshore Unit" and filed 22 Apr. 2019, which is a continuation-in-part of U.S. application Ser. No. 15/971,028, entitled "System and Method for Remote Crane Operations on Offshore Unit" and filed 4 May 2018, which issued as U.S. Pat. No. 10,654,692 on 19 May 2020, the entirety of which is incorporated by reference herein for all purposes.

BACKGROUND OF THE DISCLOSURE

On an offshore drilling vessel, rig, or platform, personnel or crew members may be performing different functions at various locations. When there is an emergency, each crew member needs to go to a designated muster station. At the same time, equipment may be moved, and various operations may be conducted in various areas on the vessel.

One piece of equipment commonly used on a platform is a crane, which is used for lifting and moving equipment (e.g., pipe stands, generators, wellhead components, etc.) on the platform, unloading supply vessels, and the like. As will be appreciated, being able to identify and track personnel in real time during operations of a crane or other equipment on the vessel can be very useful.

Likewise, should an emergency occur, the crew members must move to specified muster areas, where further safety, evacuation, or other procedures can be decided and performed. As will be appreciated, being able to identify and track crew members in real time during an emergency on the platform is also extremely helpful. During an emergency or fire drill, for example, certain crew members may not be in the designated muster station due to various reasons. Crew members may not hear the alarm, may be sleeping, may have difficulty finding the muster location, etc.

Traditionally, an overseer at a muster station must perform a roll call to identify the crew members at the muster station. The overseer needs a list of personnel and must use radio communications to contact crew members and to coordinate emergency operations. The list of crew members must be up to date, as personnel on a given day or time may change. Any crew members missing in the muster station must be physically located. For example, a designated person at the muster station manually counts the personnel and verifies who is missing. This process takes a considerable amount of time before it is known who is missing. Many vessels will have several muster stations, which compounds the difficulty in accounting for missing crew members.

Systems are available for tracking personnel on a vessel. For example, U.S. Pat. No. 6,825,763 and AU2015200877 disclose tracking systems of the prior art. A system from Aramco described in an article dated Mar. 14, 2016 in Offshore is used to track crew members once they board a vessel. The system uses passive Radio Frequency Identification (RFID) tags, such as ID cards, that are read at checkpoints as the crew members move about the vessel. In this way, RFID readers at various points on the vessel can detect crew members in established zones of the vessel, and a master controller can process the data and calculate location information.

Systems have also been developed to locate personnel during emergency situations. For example, U.S. Pat. No. 7,916,024, US2011/0309931, US2012/0130632, WO2013/033780, and US2014/0340220 disclose emergency tracking systems of the prior art. A system as described by Marine Rescue Technologies uses readers or data collectors at management stations for real-time situational awareness. The readers monitor attendance at each muster station to generate a tally, which is compared against a master list of personnel on board or the like. Muster roll call reports can then be generated automatically to show who is in attendance, who is missing, and who is at the wrong muster station.

Although such systems can be effective, vessel operators continually seek to improve operations on an offshore unit. The subject matter of the present disclosure is directed to overcoming, or at least reducing the effects of, one or more of the problems set forth above.

SUMMARY OF THE DISCLOSURE

Systems and methods are disclosed for locating personnel at a muster station on an offshore unit. According to the present disclosure, a method is used to track crew members on an offshore unit. Wireless transmitters are associated, in a database of a network system, with the crew members. Each of the wireless transmitters is configured to transmit a wireless signal associated in the database with one of the crew members. Wireless receivers arranged in a mapped layout of at least a portion of the offshore unit are associating in the database. The mapped layout at least includes one muster area of the offshore unit. Each of the wireless receivers is configured to receive the wireless signals, and each is connected in communication with at least one processing device of the network system.

An event is initiated at the at least one processing device that requires location of the crew members in the at least one muster area of the offshore unit. Any of the wireless signals of the wireless transmitters located by the wireless receivers in the at least one muster area are detected at the at least one processing device in response to the initiated event. A failure to detect at least one of the wireless signals of at least one of the wireless transmitters in the at least one muster area is determined at the at least one processing device, and the determined failure is output in the network system.

To associate the wireless transmitters with the crew members, tracking information of the crew members can be associated in the database with identifiers of the wireless transmitter. The tracking information can comprise one or more of personal identification, assignment, date boarded the unit, date to disembark the unit, authorization, designated work zone, communication information, radio channel, cellphone number, email address, pager number, emergency contact, and supervisor contact.

To associate the wireless receivers arranged in the at least one muster area of the offshore unit, a dimensional map of the at least one muster area of the offshore unit can be created in the database.

The wireless receivers can comprise nodes configured for a wireless protocol and wired to one or more power sources on the offshore unit, and the wireless transmitters can comprise beacons configured for the wireless protocol and powered by local power storage.

To detect any of the wireless signals, indication of one or more of the wireless signals can be received from one or more of portable ones of the wireless transmitters at one or more of a plurality of stationary ones of the wireless receivers.

To detect any of the wireless signals, strengths of the wireless signal of one of the wireless transmitters can be detected at at least two of the wireless receivers, and a location of the one wireless transmitter can be estimated based on the detected strengths.

To determine the failure to detect, the failure to detect can be determined within a predetermined time limit.

The determined failure can be output in a number of ways. To output the determined failure, for example, a perceptible representation of the determined failure can be generated, and the perceptible representation can be output from an interface of the at least one processing device to an operator. In another example to output the determined failure, a communication can be generated for the crew member of the determined failure, and the communication can be transmitted from an interface of the at least one processing device to the determined crew member based on the tracking information.

In yet another example to output the determined failure, the at least one wireless transmitter associated with the determined failure can be located with one or more of the wireless receivers arranged outside of the at least one muster area. Additionally, to output the determined failure, information of the crew member associated with the at least one wireless transmitter of the determined failure in the at least one muster area can be communicated to one or more portable processing devices.

According to a further aspect of the method, optical devices arranged in the mapped layout can be associating in the database. Absent detection by the wireless receivers, any person captured with at least one of the optical devices in the mapped layout can be detected with visual detection software operating on the at least one processing device. To output the determined failure, the crew member associated with the determined failure can be located and identified as the detected person.

To locate the crew member associated with the determined failure, the crew member can be located in the at least one muster area using the at least one optical device located in the at least one muster area. Alternatively, the crew member can be located outside the at least one muster area using the at least one optical device located outside the at least one muster area. To identify the crew member associated with the determined failure, the crew member can be visually identified based on a visual attribute using the visual detection software.

According to the present disclosure, a programmable storage device has program instructions stored thereon for causing a programmable control device to perform a method of tracking crew members on an offshore unit according to any of the above-aspects.

According to the present disclosure, a system is used for tracking crew members on an offshore unit. The system comprises a plurality of portable wireless transmitters, a plurality of stationary wireless receivers, a database, a communication interface, and at least one programmable control device.

The portable wireless transmitters are each configured to transmit a wireless signal, and the stationary wireless receivers are arranged in a mapped layout of at least a portion of the offshore unit. The mapped layout at least includes at least one muster area of the offshore unit. Each of the wireless receivers is configured to receive the wireless signals of the wireless transmitters. The database associates the wireless receivers with the at least one muster area and associates the crew members with the portable wireless transmitters. The communication interface is in communication with the stationary wireless receivers.

The at least one programmable control device is in communication with the database and the communication interface. The at least one programmable control device is configured to initiate an event requiring the crew members to locate in the at least one muster area of the offshore unit. In response to the initiated event, any of the portable wireless transmitters located by the stationary wireless transceivers in the at least one muster area is detected. A failure to detect any of the portable wireless transmitters in the at least one muster area is determined, and the determined failure is output.

The system can further include a plurality of visual detection devices associated with the offshore unit. The visual devices receive visual monitoring and is in communication with the communication interface.

The system can perform any of the steps of the method disclosed above for tracking the crew members on the offshore unit.

The foregoing summary is not intended to summarize each potential embodiment or every aspect of the present disclosure.

DETAILED DESCRIPTION OF THE DISCLOSURE

A. Overview of Offshore Unit

Figure 1:
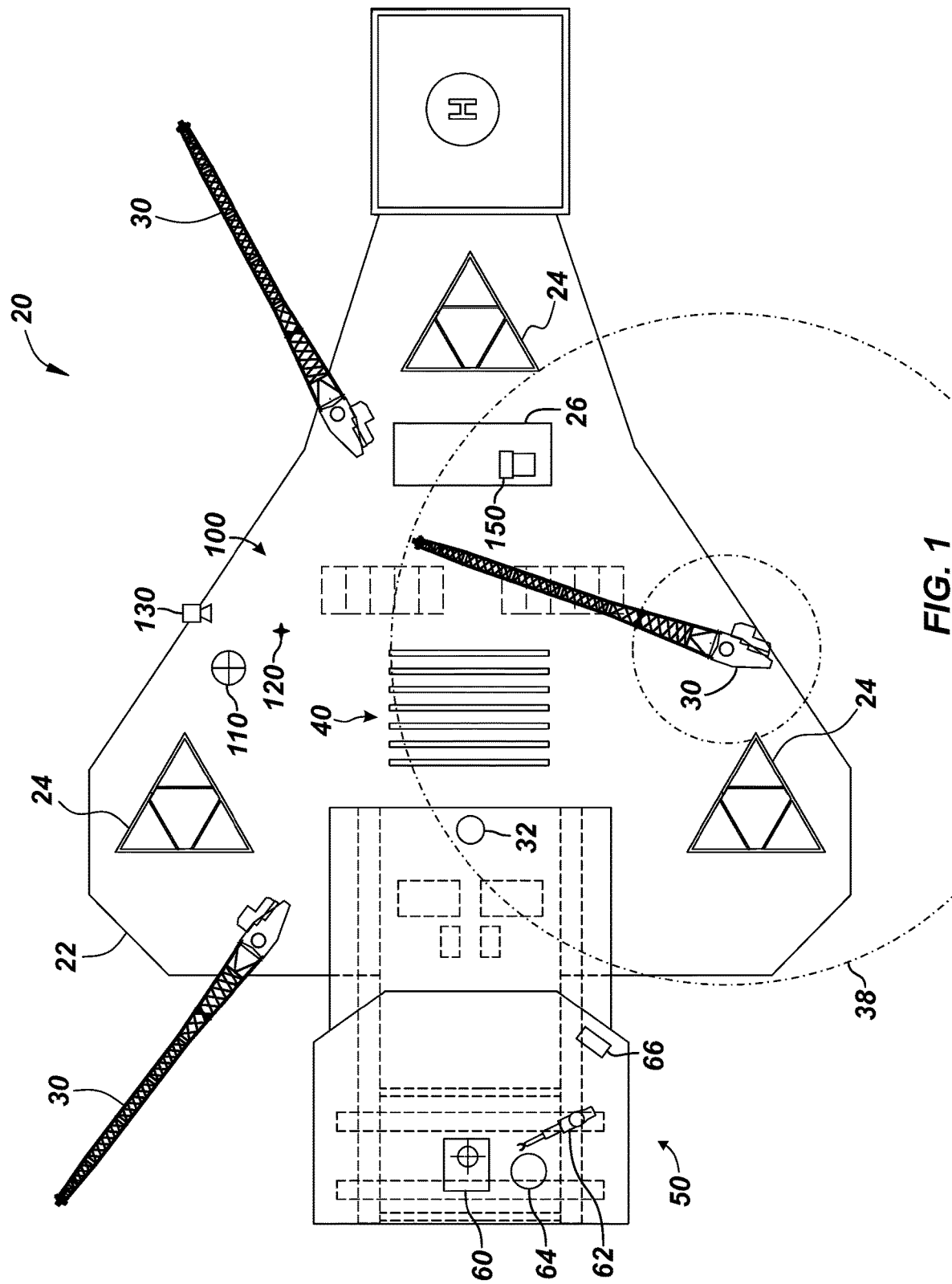
FIG. 1 illustrates a plan view of an offshore unit having a personnel tracking system according to the present disclosure.

FIG. 1 illustrates a plan view of an offshore unit 20 having a personnel tracking system 100 according to the present disclosure. Although shown here as a jack-up rig, the offshore unit 20 may be configured as a floating, fixed, or semi-submersible rig, vessel, barge, platform, mobile offshore drilling unit (MODU), mobile offshore production unit (MOPU), and the like according to various embodiments.

The offshore unit 20 includes a hull or platform 22 supported by a plurality of extendable and retractable legs 24. The unit 20 may be equipped with various facilities, including a control room 26, as well as any equipment necessary to operate offshore.

For example, the unit 20 can be equipped with a plurality of cranes 30 to assist with moving and supporting equipment to conduct various rig operations. The cranes 30 can rotate, extend, retract, lift, and lower their booms for moving equipment, pipe, and the like on the unit 20 and between the unit 20 and other vessels (not shown). Static area 38 represents areas can represent where the cranes 30 could potentially conduct lifting operations.

The offshore unit 20 can include a tower 60 equipped to conduct operations, such as drilling, completions, logging, decommissioning, workover, and other offshore operations. The tower 60 can be movable relative to the vessel's hull 22 in both forward and aft directions by a cantilever assembly 50.

The tower 60 may include a drawworks, top drive, manipulator arm, and any other equipment (not necessarily shown) to conduct operations through well center of the platform 22. As shown, for example, the tower 60 may be supported by a manipulator arm 62, a pipe carousel 64, a driller's cabin 66, a degasser system, a swarf handling system, and a shaker system, BOP handling equipment, and fluid handling equipment.

In general, the unit 20 can include other equipment, such as a knuckle boom crane 32, pipe racks 40, and the like. For example, the knuckle boom crane 32 may be provided for handling pipes from a plurality of pipe racks 40 located on the hull 22 to and from the cantilever assembly 50.

On the unit 20 (e.g., offshore drilling vessel, rig, or platform), personnel or crew members may be performing different functions at various locations and may be located in their room, on the main deck, in a control room, in an engine room, etc.

To track personnel on the unit 20, the unit 20 includes a personnel tracking system 100 (see FIG. 2B) having a central control unit 150 and having a number of elements 110, 120, and 130 incorporated into components and locations on the unit 20 and its equipment. Also as part of the personnel tracking, the unit 20 has one or more specified work zones, safety areas, muster stations, and the like for monitoring personnel during various operations, emergency situations, and the like. Details are provided with reference to FIGS. 2A-2C.

B. Diagrams of Offshore Unit

Figure 2A:
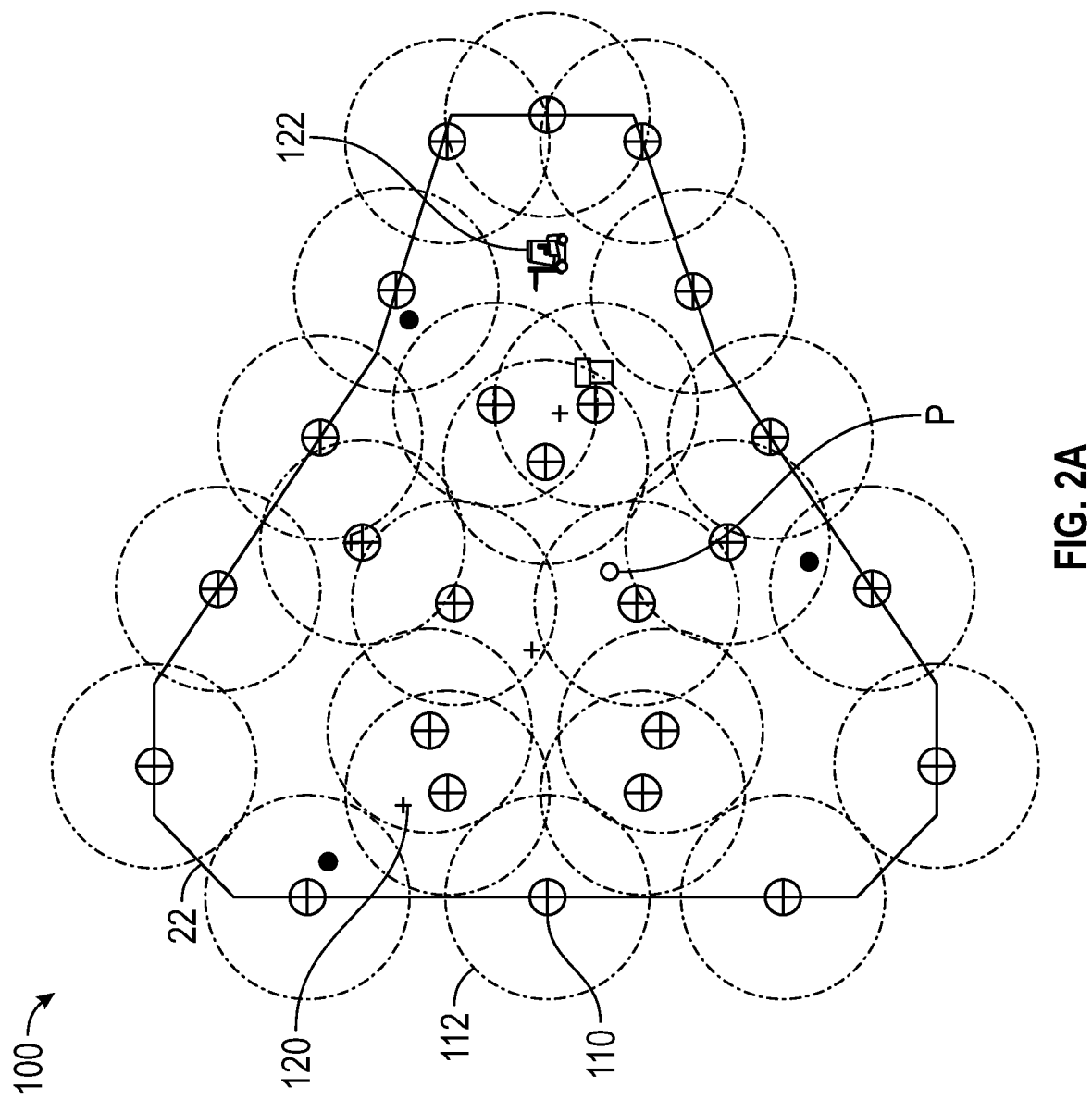
FIG. 2A diagrams a plan view of stationary and portable wireless devices according to the present disclosure arranged on the offshore unit, representing an array of radius/cell coverage for each wireless device node.

FIG. 2A diagrams a plan view showing an array of radius/cell coverage for each stationary wireless devices nodes 110 and showing portable wireless devices 120 according to the present disclosure arranged on the platform 22 of offshore unit 20. The stationary wireless devices 110 can be arranged in any suitable layout, preferably having overlapping wireless regions 112 to cover at least suitable area(s) or several zones of the platform 22 and its decks. Although shown here in a plan, two-dimensional arrangement, the stationary wireless devices 110 can be arranged in three-dimensions, such as on several decks of the unit 20. The arrangement shown in FIG. 2A is only exemplary.

In conjunction with the stationary wireless devices 110, the personnel tracking system 100 further includes the plurality of portable wireless devices 120, which are associated with entities on the unit 20. The entities can be personnel (i.e., crew members), equipment, or the like located on the platform 22. Typically, the entities of interest according to the present disclosure will include personnel or crew members, who will move on the platform 22, are authorized for certain areas, are restricted in other areas at least during given operations, and need to gather in muster stations during an emergency.

For example, portable wireless devices 120 can be associated with personnel who operate on the unit 20. Portable wireless devices 120 can also be associated with equipment and other components that may be movable on the unit 20 and/or may be needed during emergency situations. For example, movable equipment, such as cranes (30), booms (32), etc., on the unit 20 may have portable wireless devices 120 for tracking movement. In other examples, movable equipment 122 (or moving equipment) such as, fork lifts, the retractable legs (24), components on the cantilever assembly (50), other cranes, and the like may also have portable wireless devices 120 installed or attached to them. In further examples, life jackets, supplies, containers, survival equipment, and the like may also have portable wireless devices 120 installed or attached to them. (For simplicity, reference herein may be specifically made to tracking personnel, although this should be taken to mean any suitable entity for tracking on the unit 20.)

The portable wireless devices 120 can be beacons, transmitters, or other like devices that use radio-frequency identification (RFID), wireless, Bluetooth®, Wi-Fi, cellular, radio link, or other form of wireless protocol or communication. (BLUETOOTH is a registered trademark of BLUETOOTH SIG, INC.) The portable wireless devices 120 can use a battery or other local power storage. For example, the portable devices 120 can include Bluetooth® beacons or transmitters mounted on personnel hard hats, worn on outer clothing of personnel in some fashion, affixed to movable equipment on the unit 20, etc. The stationary devices 110 would at least be receivers of the same form of wireless protocol or communication. Preferably, the devices 110 and 120 use the wireless personal area network technology of Bluetooth® Low Energy (BLE). Transceivers can be used to enable read/write capabilities for the devices.

Due to the environment of the offshore unit 20, the arrangement of the wireless devices 110, 120; the signal strengths provided; the frequency ranges used; and the like should all account for walls, barriers, and other structures of the offshore unit; electrical interference of equipment; electro-magnetic iron-effects of the metal structure; and other considerations. These and other considerations will be appreciated based on the teachings of the present disclosure.

As discussed below, entities (e.g., personnel and/or equipment) are located and identified within an electronic map of the unit 20 using the wireless devices 110, 120. As also discussed below, the control system 100 can functionality identify the personnel (or equipment) as authorized or unauthorized for one or more particular areas of the unit 20. Other categories could also be used.

Figure 2B:
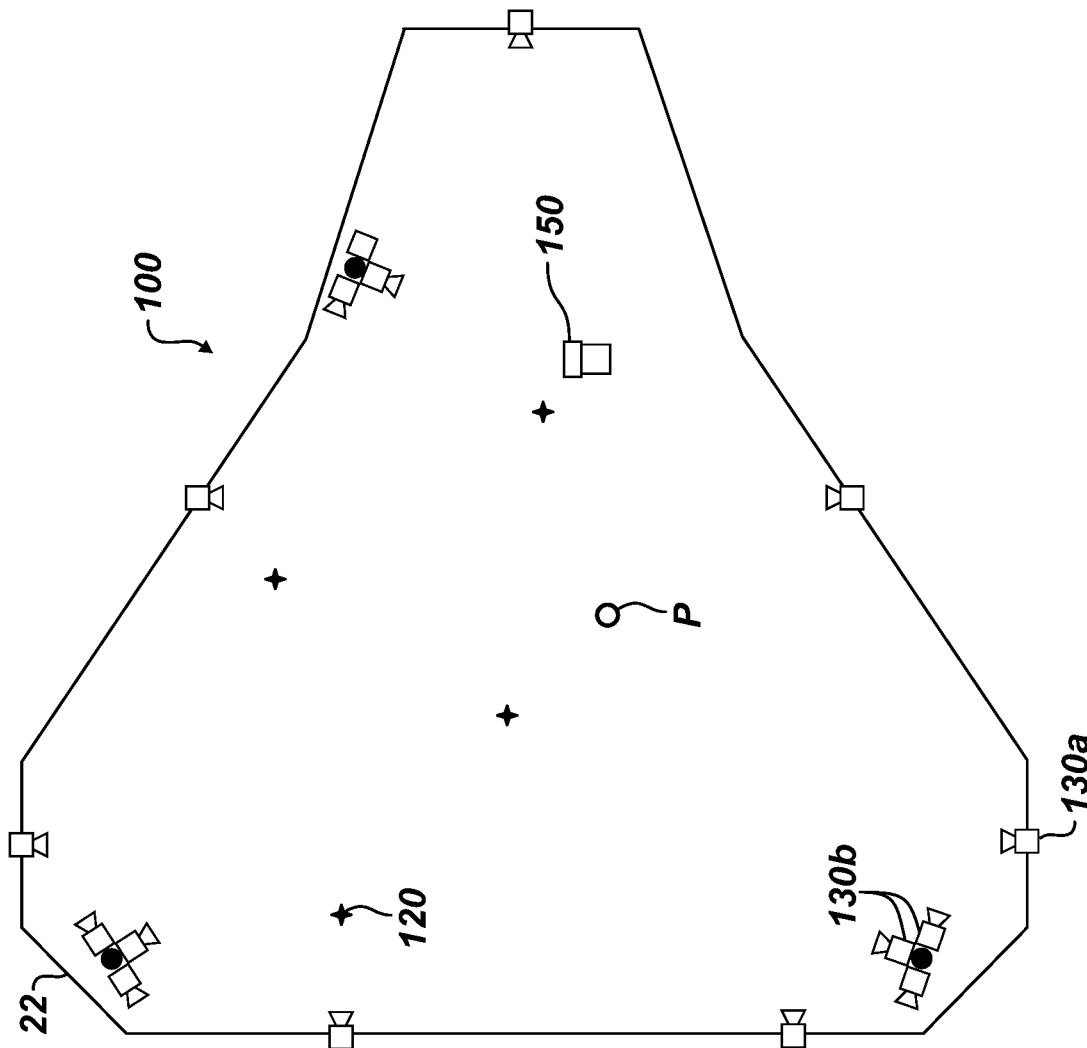
FIG. 2B diagrams a plan view of optical devices according to the present disclosure arranged on the offshore unit.
Figure 2C:
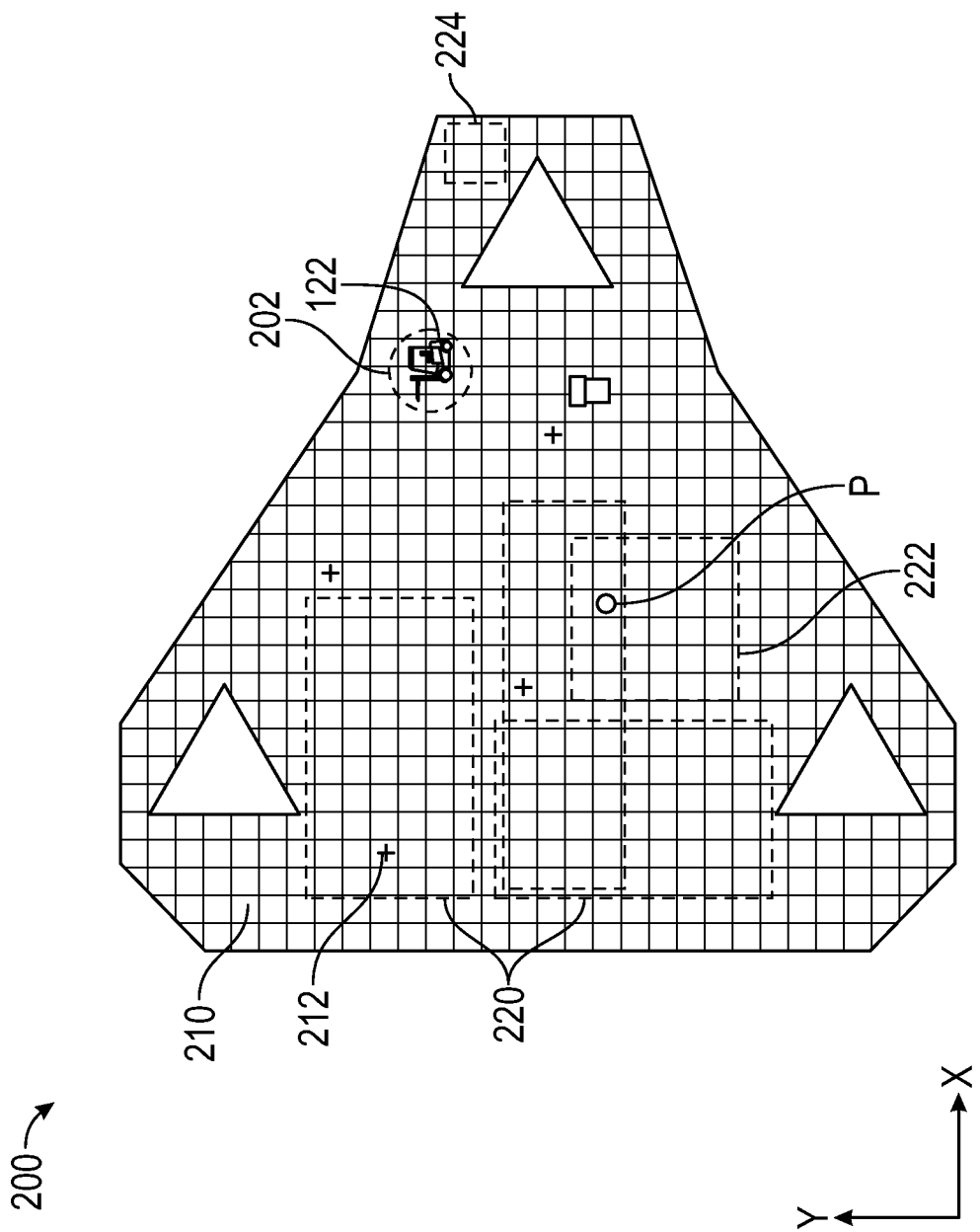
FIG. 2C diagrams a plan view of a dimensional map according to the present disclosure.

In addition to the wireless devices 110, 120, the personnel tracking system 100 can further include a plurality of optical devices 130 arranged on the offshore unit 20. FIG. 2B diagrams a plan view of optical devices according to the present disclosure arranged on the offshore unit 20. The optical devices 130 can be arranged in any suitable layout, preferably covering suitable areas. Although shown here in a plan, two-dimensional arrangement, the optical devices 110 can be arranged in three-dimensions, such as on several decks of the unit 20. The arrangement in FIG. 2B is only exemplary.

The optical devices 130 can include cameras, motion detectors, proximity sensors, or the like. For example, at least some of the devices 130 can be pan-tilt-zoom (PTZ) cameras. As with the wireless devices (110, 120), some optical devices 130a may be arranged in a stationary layout on the unit 20 to monitor various zones, regions, and areas of the unit 20 and may be arranged to provide a number of camera feeds. Other the optical devices 130b may be arranged to move on or relative to the unit 20. For example, optical devices 130b can be associated with movable equipment (e.g., cranes 30 and the like) to provide a number of moving camera feeds of the vicinity around the moving equipment.

In addition to providing camera feeds, the network of optical devices 130 can provide visual recognition of personnel and/or equipment on the unit 20. The visual recognition of personnel in addition to the output of their location on the unit 20 can be used by the tracking system 100 to determine location of personnel in areas of the unit 20.

According to one arrangement, the tracking system 100 uses a combination of the wireless and optical devices 110, 120, and 130 installed across areas of the platform 22. These areas are mapped digitally in coordinates and can be modelled as a dimensional layout or map 200, such as shown in a plan view in FIG. 2C. The dimensional map 200 includes a coordinate system 210, such as Cartesian coordinates or polar coordinates, although other systems could be used. Mapped locations 212 of the personnel (or equipment) can be determined in the coordinate system 210 of the map 200 using monitoring and tracking provided by the wireless and optical devices (110, 120, and 130). Features of the platform 22 and its equipment can also be located in the coordinate system 210 of the map 200.

Overall, the locations of the stationary wireless devices 110 are predefined (i.e., mapped) and are used to produce the static dimensional layout or map 200 of the unit 20. Although the dimensional layout can produce a two-dimensional map, the layout can also produce a three-dimensional map. Survey, global positioning system, and other such information can be used in producing the location information (e.g., x, y, z coordinates) for the map 200.

The dimensional map 200 can cover the entire (or near entire) area of the unit 20. Alternatively, one or more areas 220, 222, and 224 can be digitally laid out in the map 200 with a fixed set of coordinates that represents specific locations of interest. Any area where personnel may be located will preferably have a digital map or portion thereof created for it.

The map 200 can include the work zones 220, restricted areas 222, and muster stations 224 electronically mapped in Cartesian or other coordinates within the predefined array of stationary devices 110 and optical devices (130). The muster stations 224 represent areas where personnel are instructed to gather during an emergency and can include evacuation areas, safe areas, evacuation routes, lifeboat stations, etc.

As disclosed in the incorporated parent application, one or more static areas can be digitally laid out in the map 200 with a fixed set of coordinates can represent a potential location of possible on-board lifting operations by the cranes (30). The map 200 at least includes the static lifting areas of the cranes 30 electronically mapped in Cartesian or other coordinates within the predefined array of stationary devices (110). Such static areas can represent where the cranes (30) could potentially conduct lifting operations. Moreover, dynamic zones 202 can also be configured that move across the digital map 200 with moving equipment 122, such as when a crane (30) is moving a load.

Using the wireless devices 110, 120 and the optical devices 130, entities (e.g., personnel and/or equipment) are located and identified within the electronic map 200 of the unit 20 (e.g., at least in work zones 220, restricted areas 222, and muster stations 224). Briefly, for example, personnel (or equipment) can be identified for specifically defined areas 220, 222, and 224 or other regions of the map 200. When personnel enter the defined areas 220, 222, and 224, the tracking system (100) can generate a record, a log, an alarm, or the like. Additionally, real-time visual indications of locations and other relevant information can be overlaid on real-time camera views of the area provided to an operator. Additionally, the tracking system 100 can functionality identify the personnel (or equipment) as authorized or unauthorized for one or more particular areas of the unit 20. Other categories could also be used.

In addition to the defined areas 220, 222, and 224, the tracking system (100) can be used to monitor and control crane operations, areas around the crane, and dynamic lifting zones of the cranes, as detailed in the parent application incorporated by reference.

Briefly, for example, real-time information of zones, personnel identification, and location is integrated into an operator's user interface by augmenting and overlaying the real-time camera views to enhance the operator's awareness of operations. Designated areas for the work zones 220, restricted areas 224, muster stations 224, lifting areas, dynamic lifting zones, and the like are digitally mapped, and a combination of visual and wireless monitoring provide real-time location and identification of personnel who enter digitally mapped areas. For example, the associated areas can have a semi-transparent overlay that is superimposed on the operator's camera feed on the displays. This will provide a visual representation of the zones in real time for the operator. The mapping, personnel identification, and tracking can automatically detect personnel present in work zones 220, restricted areas 224, and muster stations 224 on the unit 20 and can automatically populate a logbook.

C. Personnel Tracking at Muster Stations

Having an overview of the tracking system 100 and its use provided above, discussion now turns to how the tracking system 100 can track entities (personnel and/or equipment) in defined areas 220, 222, and 224 and during particular operations of equipment on the unit 20.

Figure 3:
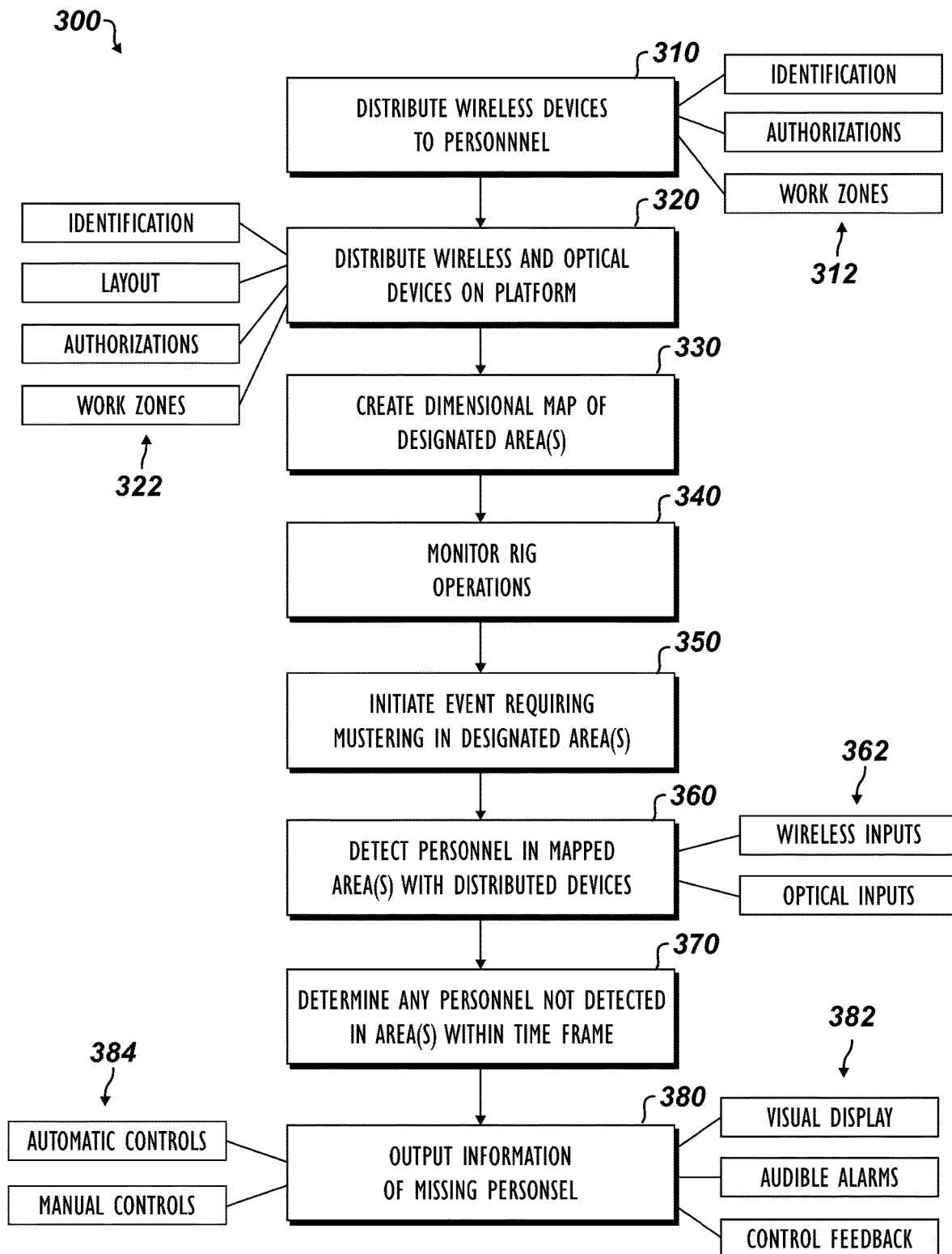
FIG. 3 illustrates a flow chart of the disclosed personnel tracking system during a mustering operation according to the present disclosure.

In particular, FIG. 3 illustrates a flow chart of a process 300 of the disclosed system 100 in tracking personnel (and/or equipment) according to the present disclosure. (For purposes of explanation, reference to features in FIGS. 1 and 2A-2C will be provided in the current discussion.)

In the present arrangement for FIG. 3, the tracking system 100 is used in muster stations 224 of the unit 20. During an event requiring personnel to muster to emergency or other locations, the system 100 recognizes who is present and who is not present in the designated muster station(s) 224 within a specified time frame. Utilizing the combination of unique personnel beacons 120 and/or visual recognition, personnel are counted, identified, and located in the muster station(s) 224 on the unit 20 with accuracy and immediacy. Personnel overseeing mustering activities can note all personnel present at the muster station(s) 224 and the location of those absent on a portable device. For those who are not present, the tracking system 100 can locate the missing personnel on the unit 20. Once located, a live camera feed and/or a digital map position detailing where the missing personnel is located on the unit 20 can be fed to the handheld device or other location, such as an on-shore monitoring station.

To track the personnel, the portable wireless devices 120 are distributed to the personnel (Block 310). Some of the devices 120 are portable and associated (e.g., worn, carried, etc.) by personnel (or attached to their equipment). Each device 120 (i.e., its identifier or signal) for a crew member is associated with tracking information 312, such as an identification of the crew member, assignment, date boarded the unit 20, date to disembark the unit 20, authorizations for the crew member, and work zones or other areas where the crew member is restricted. The tracking information can include communication information, such as radio channel, cellphone number, email address, pager number, emergency contact, and supervisor contact. This and other information can be associated in a database with the device 120 and the crew member.

The stationary wireless devices 110 and optical devices 130 are associated (e.g., mounted, laid out, etc.) on the unit 20 (Block 320). In distributing the wireless and optical devices 110 and 130, identifying information 322 is associated with them in a database. For example, the stationary devices 110 are arranged as access points with a configured layout on the unit 20 to cover various designated areas, regions, and the like, such as work zones 220, restricted areas 222, and muster stations 224, on the unit 20. In that sense, the stationary wireless devices 110 can be access points, receivers, transceivers, and the like for compatible wireless communication with the portable devices 120.

In addition to the wireless devices 110 and 120, various optical devices 130, such as cameras, motion sensors, and the like, are distributed on the unit 20 and can be arranged to monitor areas, regions, and the like, such as work zones 220, restricted areas 222, and muster stations 224. The optical devices 130 may operate in some areas as a primary form of monitoring personnel (or movable equipment), but may operate in other areas as a secondary form of monitoring that is ancillary to the wireless monitoring.

As noted above, the devices 110, 120, and 130 are associated with database information (Block 312, 322) of the tracking system 100. The database information (312) can include tracking information of the crew members associated with the wireless transmitters 120. For example, the tracking information can include identifying information (e.g., worker ID, name, position, etc.) and particular designations or authorizations for the personnel. Thus, a given personnel member may or may not be designated/authorized to access or work in various areas or regions on the unit 20, and information on such designations/authorizations can be stored in the system 100 and associated with the personnel's identification.

The database information (322) can include layout information of the devices 110, 130 and information about areas or other regions of the unit 20. For example, each of the devices 110, 130 is associated with identification information, assigned to the layout of the unit 20, and associated with work zones, restricted areas, and muster stations and the like.

From the layout and monitoring, the dimensional map 200 of the offshore unit 20 is created in the tracking system 100 (e.g., in a database) (Block 330).

With the set up and arrangement completed, the tracking system 100 monitors rig operations; the distributed devices 110, 120, and 130; the designated areas (e.g., work zones 220, restricted areas 222, and muster stations 224); and the tracked locations 212 of the personnel's wireless transmitters 120 (Block 340). To do this, wireless monitoring is received in the form of wireless inputs from the wireless devices 110, 120 associated with the personnel and the offshore unit 20. Visual monitoring can also be received in the form of optical input from the optical devices 130 of cameras, motion sensors, and the like.

The tracking involves the portable wireless transmitters 120 of the personnel wirelessly interacting with one or more stationary receivers 110 distributed on the unit 20. The wireless interaction can involve communication of identifying information, such as an ID number, signal strength, access point location, and the like, which is associated in the database with given information of the personnel, dimensional map 200, designated areas (220, 222, 224), etc. For example, the portable transmitter 120 of a crew member in a zone on the unit 20 may wirelessly interact with two or more stationary receivers 110 with known locations on the unit 20. Using triangulation, comparison of signal strengths between stationary receivers 110, and other locating techniques, the location of the portable transmitter 120 can be indicated in the dimensional map 200 of the unit 20. The personnel (or equipment) associated with the portable transmitted 120 can be identified, authorizations accessed, and other steps taken.

As a backup to the wireless monitoring or in place of the wireless monitoring in some areas, visual monitoring with the optical devices 130 of cameras, motion sensors, and the like can be used for tracking locations of personnel and equipment in the dimensional map 200 of the unit 20. Personnel and equipment, whether wirelessly monitored or not, can also be tracked in this manner. For example, personnel (e.g., P in FIG. 2C) may not currently have a portable wireless device 120, the portable device 120 may not be interacting properly, a particular zone may not have stationary wireless devices 110 that are operational, or some other reason may apply. The visual monitoring can be used in these and other situations to locate, track, and potentially identify the personnel (P).

The monitoring (Block 340) discussed above can be continuous with repeated monitoring and updating in real-time. Such tracking has benefits on its own in monitoring various operations on the unit 20.

To monitor rig operations, the system 100 may be integrated with rig controls, emergency equipment, fire detection equipment, weather detection equipment, and the like on the unit 20. When an alarm condition or emergency occurs, the tracking system 100 initiates an event requiring mustering of crew members in designated muster stations 224 (Block 350). The event can be initiated automatically from another monitoring system, such as weather or emergency monitoring system. Alternatively, the tracking system 100 may allow for an operator to initiate the event. A number of events may occur on the unit 20 that require personnel to muster at muster stations 224. For example, severe weather conditions may require crew members to leave areas of the unit 20 and congregate at the muster stations 224.

In response to the detected event, the tracking system 100 detects the personnel in mapped muster stations 224 with the distributed devices 110, 120, and 130 (Block 360). To detect the personnel, the tracking system 100 obtains dynamic tracking parameters (362) of the offshore unit 20. The dynamic tracking parameters include wireless inputs from wireless devices 110, 120 and include visual inputs from cameras 130 associated with muster stations 224 and surrounding areas, communications from personnel on the unit 20 and other control stations 60, locations 212 of personnel in the dimensional map 200, identification of the personnel, visual boundaries of zones in the dimensional map 200, and other information.

The tracking system 100 has access to a manifest and determines if any personnel have not been detected within the designated muster station 224 at least within a defined time frame (Block 370). For example, the tracking system 100 can determine a failure to detect any of the wireless signals of the wireless transmitters 120 of given crew members in the designated muster station(s) 224. The tracking is done automatically as the wireless receivers 110 at the muster station 224 detect each of the wireless transmitters 120 in the area, and the system 100 registers the associated crew member on the muster station's manifest in the system database.

During the event, the system 100 can then output information to operators (Block 380). The output (382) can include visual display, audible alarms, control feedback, etc. Primarily, the output (382) can include lists of crew members in the muster station 224 and lists of missing crew members of the station 224. Operators at the muster station 224 can access the lists and can perform additional actions. For example, the output (328) can take the form of visual display in user interfaces of portable units. Graphical overlays can be included in the visual displays to depict the muster stations 224, information of located personnel, information of personnel missing from the muster stations 224, camera feeds, etc.

The tracking system 100 can also generate automatic or manual controls (384). In response to a missing crew member, for example, automated or manual communications may be initiated. Automated communications can include a visual display, an alarm, an instruction, or the like may be sent via the communication interface from the system 100 to the operator, the missing personnel, and others using an appropriate form of communication.

The controls (384) may allow operators to take active steps. For missing personnel from the muster stations 224, the tracking system 100 may determine the tracked location 212 where they are located. The system 100 may then allow operators to contact the crew member, to initiate an alarm on the crew member's wireless device 120 or communication equipment, to locate the crew member in other areas of the unit 20, etc.

D. User Interface Diagrams

Figure 5A:
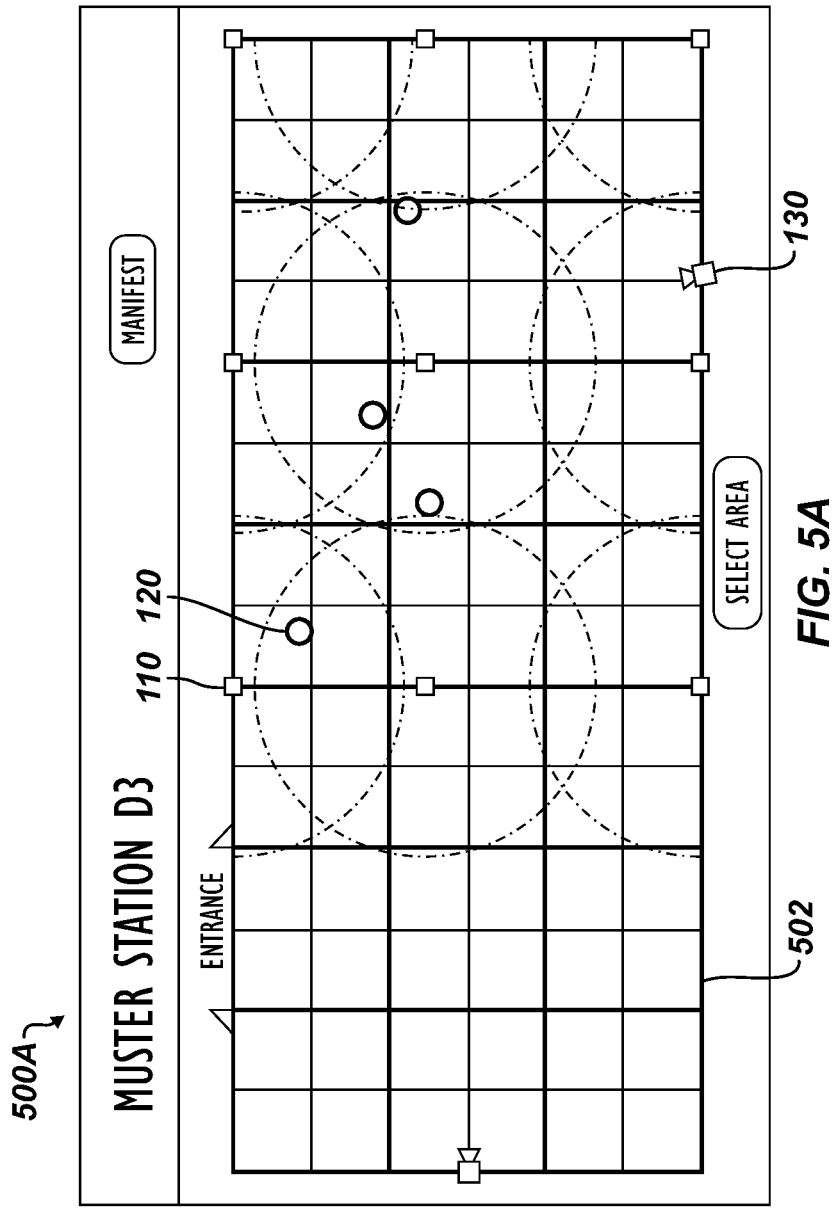
FIG. 5A diagrams a user interface map of stationary wireless devices and optical devices for the disclosed tracking system arranged on portion of an offshore unit.

As a discrete example of tracking personnel at muster stations, FIG. 5A diagrams a user interface 500A mapping stationary wireless receivers 110 and optical devices 130 for the disclosed tracking system 100 arranged in an example area 502, such as a muster station. Various wireless transmitters 120 of personnel are located in the mapped area 502 of the muster station by the tracking system 100, and a manifest of the personnel can be generated.

Figure 5B:
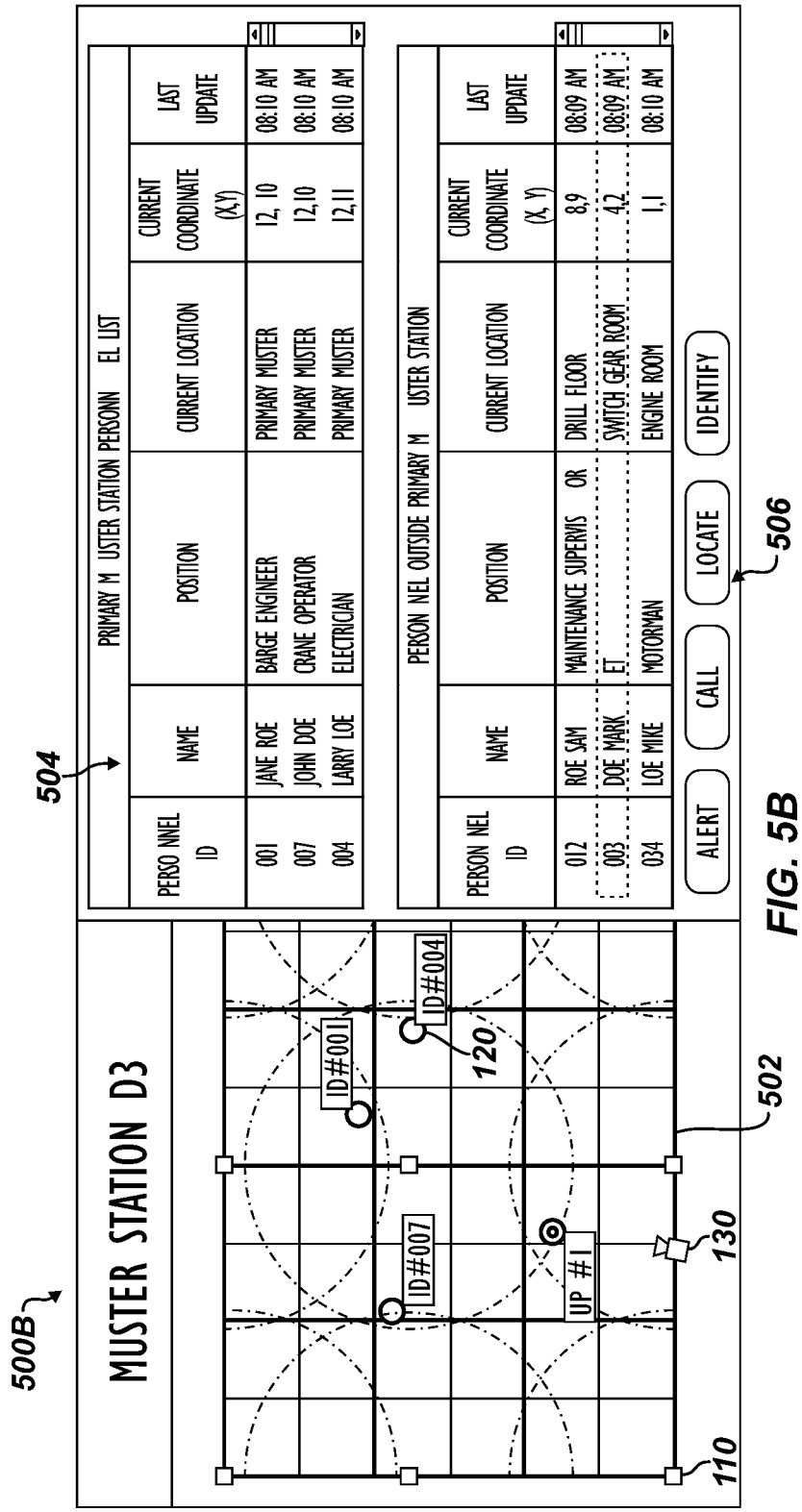
FIG. 5B diagrams the map of personnel tracked on the mapped portion.

As a further example, FIG. 5B diagrams a user interface 500B having the mapped area 502 of personnel tracked in the muster station and showing a manifest 504 of those logged and those not logged within the muster station. An operator of the tracking system (100) can select one or more of the missing personnel and can select one or more controls 506 to generate an alert or to call the selected personnel through communication information associated in the database.

With the controls 506, the operator can also use the tracking system (100) to locate the selected, unlogged personnel. For example, FIG. 5C diagrams a user interface 500C showing another mapped area 510 and a video feed 512 of the selected, unlogged personnel tracked in another area of the unit 20. The selected, unlogged crew member on the missing manifest from the previous screen 500B has been located in this mapped area 510 using the wireless devices 110, 120.

Some of the personnel may not be located through the wireless transmitters 120, either due to a malfunction of the transmitters 120, poor battery level, loss of the transmitter, etc. The visual tracking can be used to locate and track the personnel in addition to or in place of the wireless tracking.

For example, the user interface 500B in FIG. 5B includes unidentified personnel (e.g., NO TX #) in the manifest 504. The unidentified include any persons detected by visual detection software in the images/video captured with at least one of the optical devices 130 in the muster station when that person has not been detected with the wireless system. The person can be assigned a tracking identifier and can be located visually, but the identity of the person may not be known. The controls 506 allow the operator to identify the detected person who has been located in the muster station visually without the wireless system. This identification can be done manually by the operator entering the identity of the crew member so that the visual tracking can continue to identify and track the crew member. Alternatively, the visual detection software can determine the identity of the detected person automatically using a visual attribute, such as facial recognition, body type, walking pattern, a symbol, a marker, an emblem, a uniform, clothing, a hardhat type, or some other form of identifying feature or physical attribute.

Figure 5C:
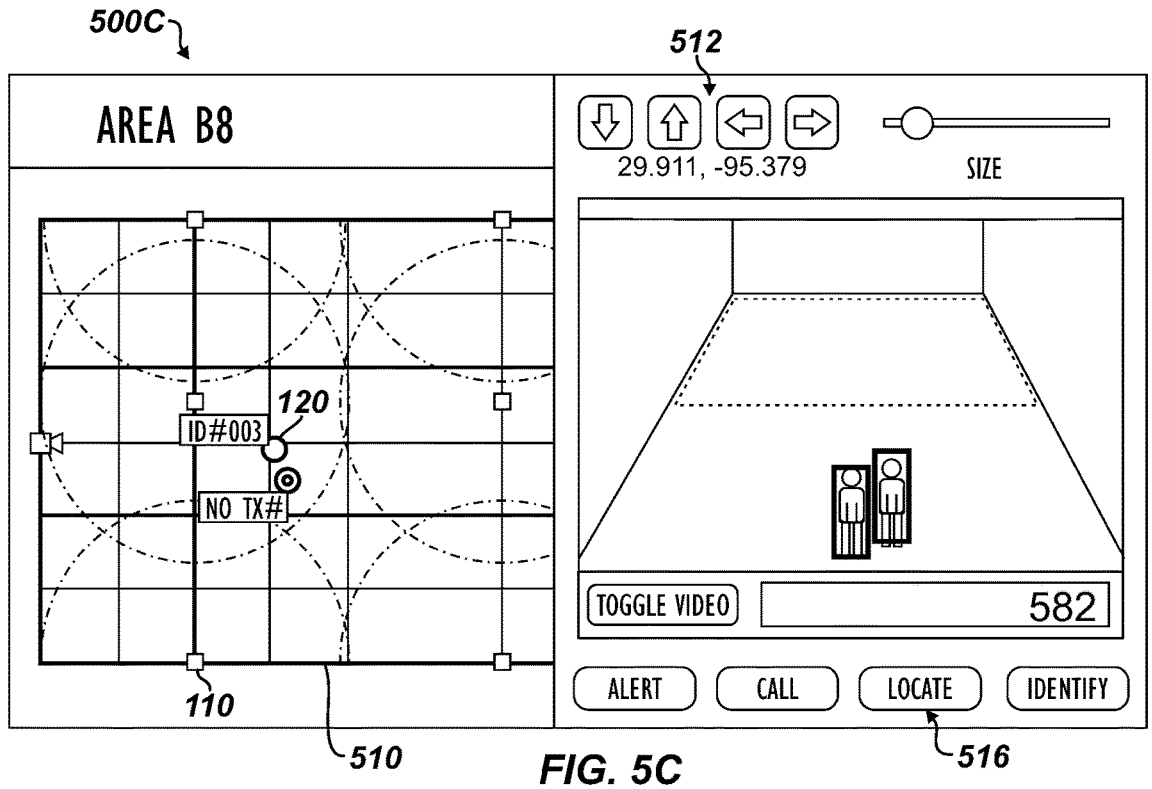
FIG. 5C diagrams the map and a video feed of personnel tracked on the mapped portion.

In another example, the video processing of the feed 512 in FIG. 5C has detected an additional person outside the muster area (224) who has not been identified with a transmitter (120). Although the person is detected and located visually in the mapped area 510 and can be assigned a tracking identifier, the identity of the person may not be known. The controls 516 can allow the operator to identify the detected person who has been located in the outside area visually without the wireless system. This identification can be done manually by the operator entering the identity of the crew member so that the visual tracking can then identify and track the crew member. Alternatively, the visual detection software can determine the identity of the detected person automatically or based on the operator's selection using a visual attribute, such as facial recognition, body type, walking pattern, a symbol, a marker, an emblem, a uniform, clothing, a hardhat type, or some other form of identifying feature or physical attribute.

Overall, depending on the visual detection software, the visual tracking can detect persons in the captured image or video, although personal identification of the crew members may not be achieved. In other implementations, the visual detection software can be used to personally identify the crew members visually detected by the optical devices 130, using facial recognition, body type, walking pattern, a symbol, a marker, clothing, or some other form of identifying feature or physical attribute. In that sense, visual detection of any person in a mapped area by one or more optical devices 130 can be compared to wireless detection of wireless transmitters 120 in the same mapped area by one or more wireless receivers 110. A detected person who has been both visually and wirelessly located in the mapped area can then have one or more visual attributes captured by the optical device(s) 130 associated with the known identifying and tracking information of the crew member, who is known from the crew member's associated wireless transmitter 120 detected by the wireless receivers 110. Likewise, a detected person who has been only visually located but not wirelessly located in the mapped area can have one or more visual attributes captured by the optical device(s) 130 associated with identifying and tracking information generated for the visually detected person. This generated information can then be used to automatically or manually identify the visually detected person as a particular crew member. In the meantime, the generated information can be used to track the detected person even as the person moves to other mapped areas of the offshore unit 20 monitored by other optical devices 130.

E. Personnel Tracking During Rig Operations

In addition to determining when crew members are missing from muster stations 224 during an event and locating the missing crew member on the unit 20, the disclosed tracking system 100 can monitor on-going, normal operations on the unit 20, track crew members, and perform a number of functions. To do this tracking of personnel during operations, the tracking system uses the same elements discussed above for tracking at muster stations.

In this way, a combination of individual wireless transmitters 120 (e.g., wearable Bluetooth beacons) and visual detection can provide real-time personnel detection/location and identification visible to operators. The wireless receivers 110 (e.g., Bluetooth receiver nodes) stationed to establish a grid of physical coordinates can be used to locate and track in real-time the wireless transmitters 120. The digital map 200 representing the area over which operations are to take place is created from the locations of the receiver nodes 120. Movements of the crew members are tracked and displayed in real-time across this digital map. Zones that define authorized and unauthorized areas for specific personnel are defined on the digital map and are monitored in real-time for violations. Violations may be logged and may actuate remedial actions, such as alarms, directed communications to crew members, change in operations, physical intervention, etc.

Figure 4:
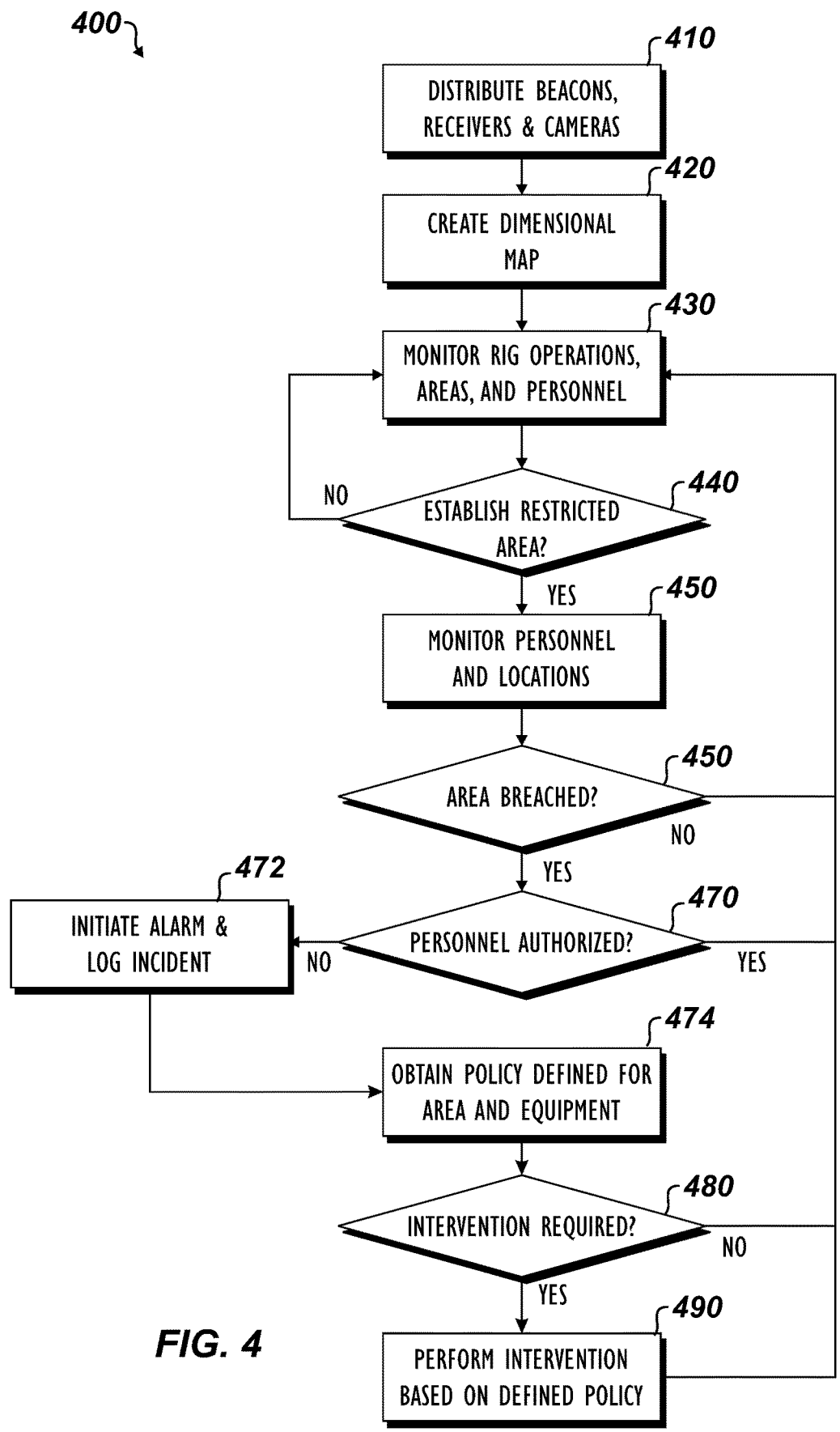
FIG. 4 illustrates a flow chart of the disclosed personnel tracking system during rig operations according to the present disclosure.

To that end, FIG. 4 illustrates a flow chart of a process 400 of the disclosed system 100 in tracking personnel during operations according to the present disclosure. (For purposes of explanation, reference to features in FIGS. 1 and 2A-2C will be provided in the current discussion.)

As before, the process 400 involves distributing the receivers 110 and cameras 130 on the unit 20 and distributing the beacons 120 to personnel (Block 410) and involves creating the dimensional map (Block 420). These steps for set up and arrangement are similar to those discussed previously. The tracking system 100 monitors rig operations, personnel, and designated areas (i.e., work zones 220, restricted areas 222, muster stations 224, etc.) (Block 430). In monitoring the rig operations, the system 100 determines whether to establish a restricted area 222 or whether a restricted area 222 is already established (Decision 440). For instance, some areas 222 may be permanently restricted or may be restricted based on which particular rig operations are being conducted at the time. Generally, a certain rig operation that is being performed at the time may require an area of the unit 20 around equipment to be restricted to all or certain crew members. A number of rig operations dictate different scenarios that define when crew members can or cannot be located in relation to equipment.

For example, the system 100 can monitor states of equipment in areas of the unit 20 during current rig operations. Certain equipment may be operating, not operating, moving, not moving, etc. in certain stages of the rig operations. The state of the equipment in a designated area may then define whether the area is restricted or not.

In monitoring the personnel, the system 100 monitors the personnel (i.e., their particular ID, authorizations, etc.) and monitors their locations in relation to the established areas (e.g., work zones 220, restricted areas 222, etc.) (Block 450).

The tracking system 100 determines if a crew member has been found (located) in or has breached a restricted area 222 (Decision 460) and determines if the identified crew member is authorized for the area 222 (Decision 470). For example, a particular crew member may enter or be found in a restricted area 222 for which the crew member is not authorized during the operation performed with equipment in the area 222. Other crew members may be allowed in the area 222 at the time. Alternatively, all crew members may be restricted in the area 222 during the rig operation.

In response to the detected breach, unauthorized entry, etc., the tracking system 100 initiates an alarm, logs the incident, sends out a communication to the crew member or to others, and performs other ancillary functions (Block 472). The alarms can be local alarms in the restricted area 222 or can be general alarms or alters. Communications can be directed to the identified crew member and/or to others.

In some situations, additional actions may be necessary in addition to initiating alarms, logging the event, and sending out communications. In these types of situations, the system 100 determines if intervention is required (Decision 480). For example, the crew member may be in the vicinity of moving or operating equipment during a particular rig operation, and the crew members needs to be removed from the area 222 or the equipment needs to be stopped. The crew member may have been only visually detected in the restricted area because the wireless system has not detected a wireless transmitter 120 of an associated crew member for whatever reason. Therefore, the detected person's identity and corresponding authorizations may not be known. Any number of interventions may be needed given the current rig operation, operating equipment, persons detected, and the like.

To determine if intervention is required, the system 100 obtains a policy defined for the area, the equipment, and the current rig operation (Block 474). Rig operations have defined policies governing protocols for controlling equipment and stopping operation given certain conditions, and the system 100 is coded with the policies and runs a decision-making process based on acquired information to determine if, when, and how to control/stop/alter the rig operation. Ultimate control may be left for user intervention and final decision. In the end, the tracking system 100 performs (or is at least used to perform) the required intervention based on the defined policy (Block 490).

In one example, a restriction in a designated area may be initiated in response to a monitored state of the equipment because the equipment is determined to be operating and because an associated policy restricts crew members in the designated area when the equipment is operating. The action defined by the policy associated with the equipment may call for the equipment to be shutdown. The shutdown can be initiated automatically or manually. Alternatively, the action defined by the policy associated with the equipment may call for the equipment to continue operation. In this case, a determined action can be initiated automatically or manually that involves initiating an alarm condition, communicating with the associated crew member having the wireless transmitter in the restricted area, calling for intervention by other crew members, and/or other actions.

In another example, a restriction in a designated area may be initiated in response to a monitored state of the equipment because the equipment is determined to be moving and because an associated policy restricts crew members in the designated area when the equipment is moving. The action defined by the policy associated with the equipment may call for the equipment to be stopped, which can be initiated automatically or manually. Alternatively, the action defined by the policy associated with the equipment may call for the equipment to continue moving. In this case, a determined action can be initiated automatically or manually that involves initiating an alarm condition, communicating with the associated crew member having the wireless transmitter in the restricted area, calling for intervention by other crew members, and/or other actions.

In some scenarios, a person may be detected visually but not wirelessly in the restricted area 222 through visual monitoring, but the person may not be identified. For example, the person may not have their wireless transmitter 120, there may be some malfunction, or the like. The person can be assigned a tracking identifier and can be located visually, but the tracking system may be unable to personally identify the visually detected person from associated information in the database. In this case, personal communication directly with the detected person cannot be achieved. The tracking system 100 can be used so one or more other crew members can intervene. The system 100 can send communications to the other crew members and instruct them to intervene with the unidentified crew member in the restricted area 222.

In other scenarios where a person may be detected visually but not wirelessly in the restricted area 222, identification of the person as a particular crew member can be done manually by the operator entering the identity of the crew member so that the visual tracking can then identify and track the crew member. Alternatively, the detected person may be visually identified as a particular crew member automatically through visual monitoring. For example, the visual detection software can determine the identity of the detected person automatically using facial recognition, symbol, marker, clothing, or other some of form of identification or physical attribute.

F. User Interface Diagram

Figure 5D:
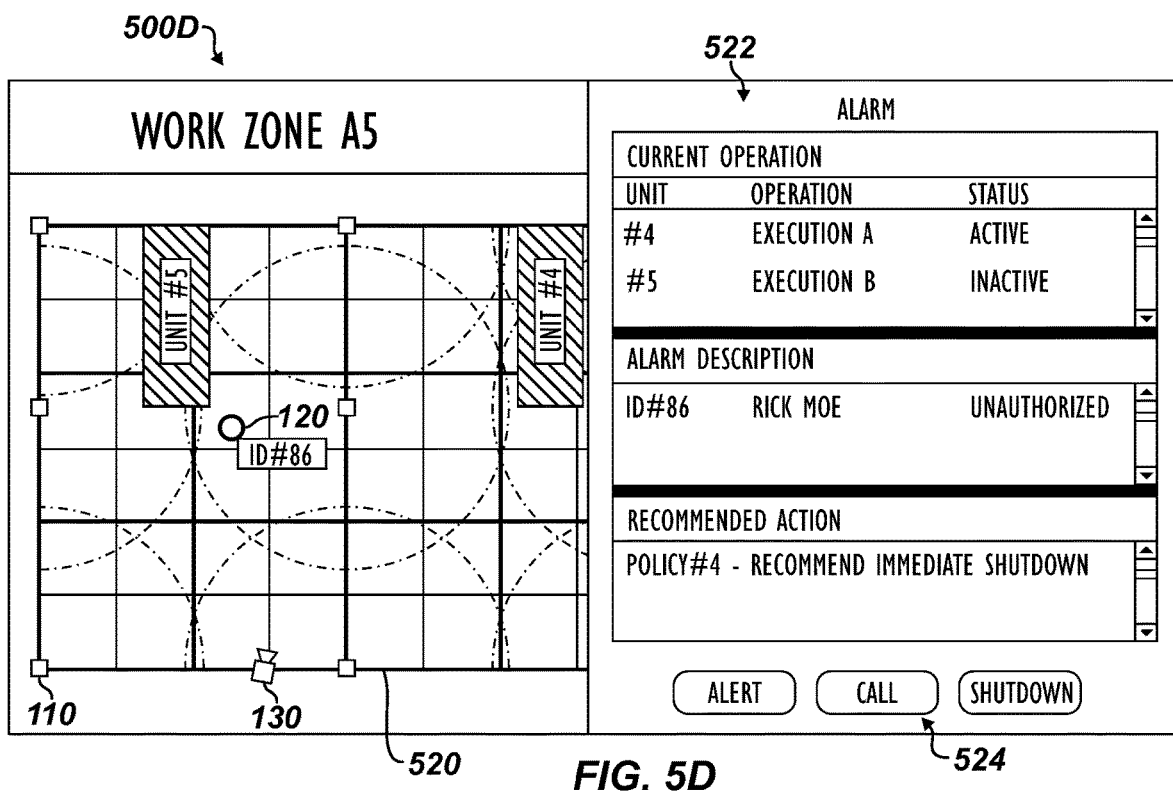
FIG. 5D diagrams the map of equipment and tracked personnel in a mapped portion.

As a discrete example of tracking personnel during operations, FIG. 5D diagrams a user interface 500D mapping an area 520 (e.g., work zone) having stationary wireless receivers 110 and optical devices 130 for the disclosed tracking system 100. The work zone 520 may have a restricted boundary or may be restricted based on current operations. The system 100 monitors the operational state of equipment in the area 520, such as whether the equipment is active or inactive, operating or not operating, moving or not moving, etc. The current operating state of the equipment may restrict all (or certain) personnel from being located in the work zone 520 or in the vicinity of the equipment. An alarm condition may be generated automatically or manually, and the system 100 can display details 522 of the alarm condition to the operator.

For example, the area 520 has equipment (e.g., units #4 & #5), and a crew member has been located in the area 520 near the equipment. The interface 500D displays an alarm condition 522, showing the current operation, state, or status of the rig operation; describing the alarm; and giving the policy defined for handling the alarm condition. In the depicted example, equipment (unit #4) is active with an execution, and the identified crew member is unauthorized in the work zone 520 for the operation of the equipment. The coded policy defines a recommended action of immediate shutdown of the rig operation (i.e., shutdown of the active equipment). The operator can select one or more controls 522 to generate an alert, to call the selected personnel through communication information associated in the database, or to shut down the given equipment.

As noted above, certain policies govern how to handle various situations, such as when personnel are located close to operating or moving equipment. In some cases, the policy may dictate that the equipment needs to be stopped or turned off. In other cases, stopping or turning off the equipment may not be warranted due to the impact to other equipment or operations on the unit 20. Although the dictated policy may be implemented automatically, the tracking system 100 can display the policy recommendation and permit the operator to select actions, such as alerting the personnel with an alarm in the area, calling the identified personnel through associated communication information, or shutting-down/stopping the operating/moving equipment.

One particular example of a rig operation requiring monitoring and possible intervention when an unauthorized crew member is found in a restricted zone involves crane operations, as detailed in the parent application incorporated by reference.

G. Schematic Views of Tracking System Components

Various components of the tracking system 100 have been detailed above. Discussion now turns to FIGS. 6A-6C, which illustrate schematic views of components for the tracking system 100 according to the present disclosure.

Figure 6A:
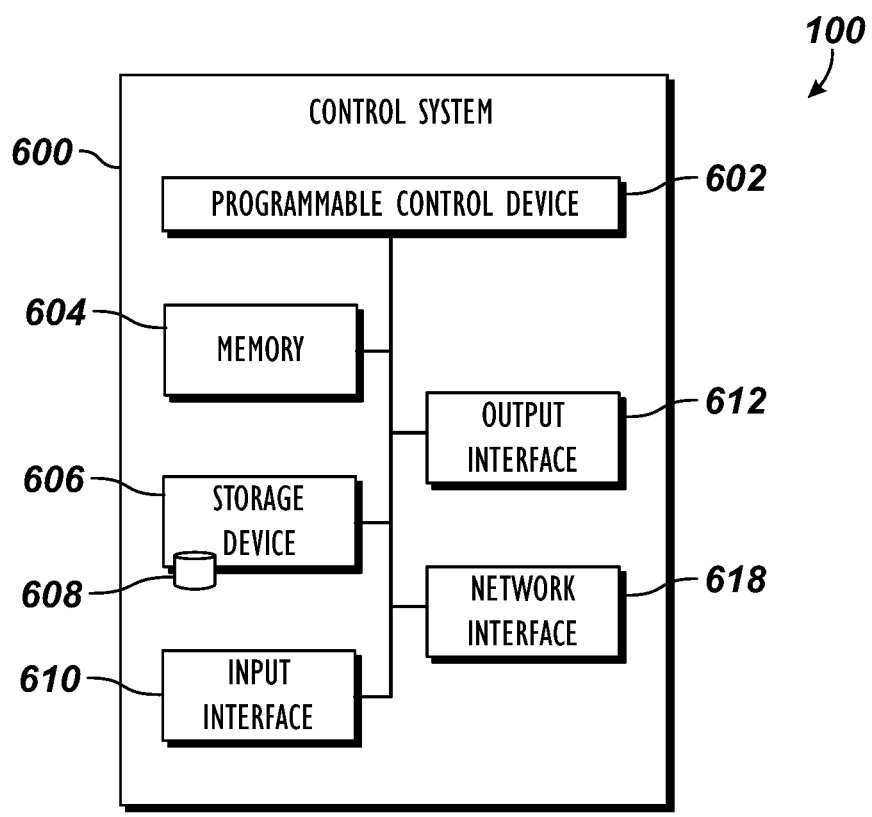
FIGS. 6A-6C illustrate schematic views of the personnel tracking system according to the present disclosure.

Referring to structural elements as shown in FIG. 6A, the tracking system 100 includes a control system 600 having a programmable control device 602, which can use any suitable computing hardware and software, including one or more of programmable logic controls, communication switches, servers, computers, etc. For example, the programmable control device 602 can include distributed computer resources of programmable logic controls, communication switches, servers, computers, etc. As shown in FIG. 6A, the programmable control device 602 is in operable communication with memory 604, storage device(s) 606, input interfaces 610, output interfaces 612, and network interfaces 618. These structural elements can use any suitable hardware and software for operating the cranes according to the techniques disclosed herein. Database(s) 608 store configuration details, tracking information, and dimensional map(s) of the offshore unit (20) in which the stationary devices (110) and the optical devices (130) are laid out and in which the portable devices (120) are tracked.

Figure 6B:
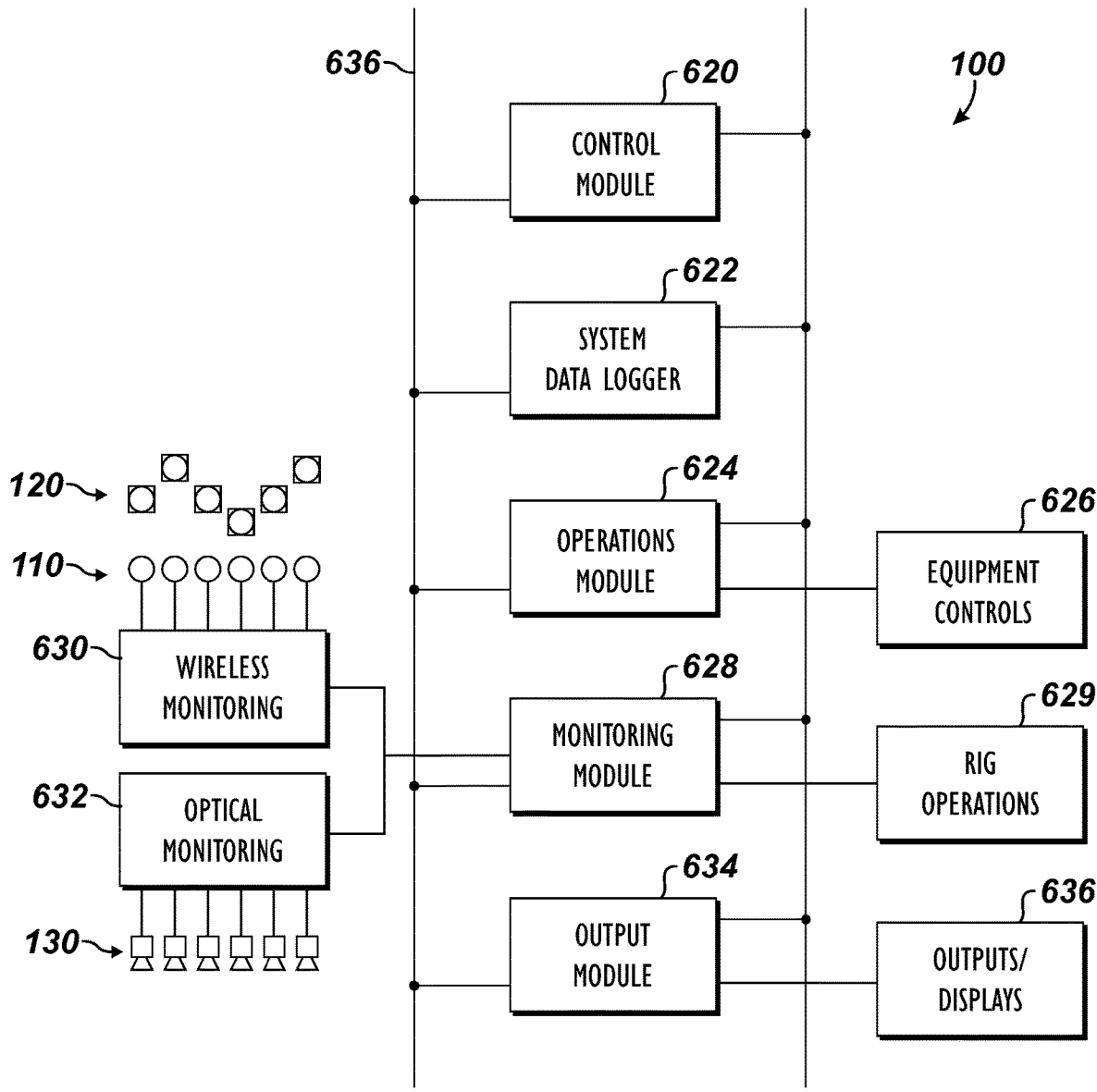

FIG. 6B schematically illustrates further details of the tracking system 100, which can include a control module 620, a system data logger 622, an operations module 624, a monitoring module 628, and an output module 634. As will be appreciated, the modules can be implemented using combinations of structural and functional elements in hardware and software.

The modules are in communication with one another via a communication bus 636. The control module 620 operates as the main control or hub for coordinating operation and interaction of the various modules and structural elements (FIG. 6A) of the tracking system 100. The system data logger module 622 can log data of the system 100 and its operation in databases of storage devices and the like.

The other modules are responsible for interaction with operational aspects of the system 100 and communicate with external modules, components, and equipment. For example, the operations module 624 is in communication with equipment controls 626 for rig equipment, such as cranes, boom crane, pipe handler, drilling equipment, BOP handling equipment, swarf skip equipment, fluid handling equipment, a shaker, a pump, an electrical panel, a generator, manipulators, etc. The operations module 624 is thereby responsible for exchanging suitable information with rig equipment to determine status of rig operations, perform controls, etc.

The monitoring module 628 is in communication with the wireless monitoring equipment 630 and optical monitoring equipment 632. The monitoring module 628 is thereby responsible for exchanging suitable information for monitoring and tracking personnel/equipment. As noted herein and presented again here, the wireless monitoring equipment 630 includes an array of stationary wireless devices 110, such as wireless receivers, Bluetooth access points, RFID transceivers, or the like, which interact wirelessly with portable wireless devices 120. Likewise, the optical monitoring equipment 632 includes an array of optical devices 130, such as cameras, motion detectors, and the like, and receives optical monitoring in the form of video feeds, pictures, motion detection, and the like.

Finally, the output module 634 is in communication with outputs and displays 636 for presentation to operators, personnel, and the like. The output module 634 is thereby responsible for exchanging suitable communication information for operators, personnel, and users.

The information provided to the operators and users by the tracking system 100 can augment camera views and can provide graphic rendering of mapped areas. The tracking system 100 receives various inputs (e.g., position coordinates, instrumentation feeds, alarm status, etc.), visually maps out the areas, and provide graphic overlays and other user interfaces for the operator's user interface.

For example, the coordinates of work zones, restricted areas, or muster station are passed on in real-time to the output module 634 of the system 100. In turn, output module 634 can use these coordinates to render a transparent red boundary on the display screens displaying various feeds from multiple camera angles to the operator's user interface. This graphical rendering can be turned on or off by the operator.

When the tracking system 100 determines an alarm status indicating unauthorized personnel in a restricted area (222), indicating personnel missing from the muster station (224) within a specified time frame, etc., the output module 634 can place an alarm banner on a screen for the operator, can also send out communications, and can act to automatically locate the personnel in other mapped areas of the unit 20.

Further elements, such as instrumentation/sensors and crane controls, of the tracking system 100 in FIG. 6B can be used for monitoring and controlling crane operations, as detailed in the parent application incorporated by reference.

Figure 6C:
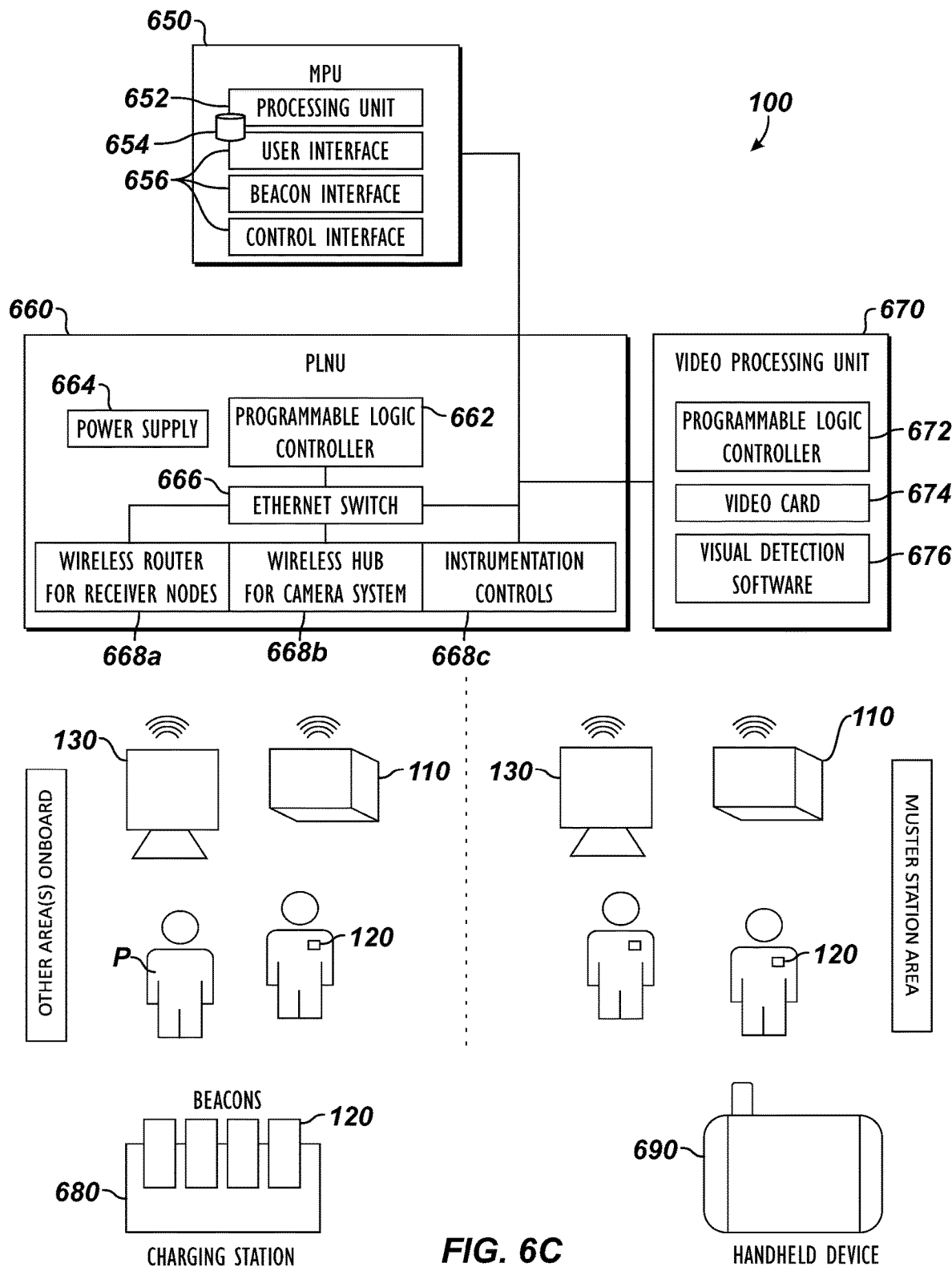

Finally, FIG. 6C illustrates a schematic arrangement of components of the personnel tracking system 100. The components of the system 600 include a main processing unit (MPU) or computer 650 having a processing unit 652 and memory 654. The computer 654 holds and handles software and interfaces for users, visual detection and personnel ID, wireless Bluetooth® nodes and beacons, and controls.

The computer 650 connects by redundant communications to a power line networking unit (PLNU) 660. The networking unit 660 contains several pieces of hardware to operate as an instrumentation and networking hub. For example, the unit 660 includes a programmable logic controller 662, two power supplies 664, a Power over Ethernet (PoE) switch 666, a wireless router 668a for the wireless nodes, a wireless hub 668b for the camera system being used for visual detection, and instrumentation control interface 668c for rig equipment, such as cranes, pipe handling equipment, etc. The Ethernet switch 666 also connects to the local area network (LAN) for the offshore unit 20.

The wireless router 668a communicates with the wireless receivers 110 distributed in the work zones, restricted areas, muster stations and other mapped, designated areas for wirelessly tracking the wireless beacons 120 on the crew members (P). The wireless hub 668b communicates with the cameras 130 and other optical devices distributed in the work zones, restricted areas, muster stations and other mapped, designated areas for visually tracking the crew members (P) who either have or do not have wireless beacons 120.

A video processing unit 670 connects to the power line networking unit 660 and contains the processing hardware for the visual detection software. The video unit 670 contains a processing unit 672, a video card 674, and memory. The processing unit 672 is interfaced via the network switch 666 to the main processing unit 650.

Additional components of the personnel tracking system 100 can include power bank enclosure(s) 680 containing charging equipment for all of the batteries that are used on the wireless transmitters 120 (e.g., Bluetooth beacons). The stationary wireless receivers 110 may have batteries for power backup, but they are preferably hardwired to a power supply on the offshore unit 20.

One or more user devices 690 can be used for operating, monitoring, and troubleshooting the system 100. The user devices 690 can enable users to physically interact in the digital static map area away from the main programing hub, and view and operate operations of the tracking system 100. The user devices 690 can be mobile handheld devices, permanently installed workstations, and the like. During a muster event, for example, personnel responsible for the oversight of a muster station 224 can have a handheld device 690 that will immediately download a list of all personnel present and those who are missing.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure. The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method, comprising:
creating, in a database, a dimensional map of an offshore unit;
tracking, in the database, locations of entities in the dimensional map of the offshore unit by receiving at least wireless monitoring from wireless devices associated with the entities;
obtaining operating parameters of movable equipment on the offshore unit;
calculating, with a programmable control device, a dynamic zone of the movable equipment based on the operating parameters, wherein a location of the dynamic zone on the dimensional map changes by moving across the dimensional map of the offshore unit with movement of the movable equipment across the offshore unit;
detecting, with the programmable control device, a conflict of at least one tracked location of an entity from the locations of the entities as interfering with the dynamic zone of the movable machine; and
when the conflict is detected, outputting an indication of the conflict via the programmable control device.

2. The method of claim 1, wherein creating, in the database, the dimensional map of the offshore unit comprises creating at least hazardous zone in dimensional map that corresponds to a particular region of the offshore unit.

3. The method of claim 1, wherein receiving at least wireless monitoring from the wireless devices comprises receiving indications of the entities from portable ones of the wireless devices associated with the entities at one or more of a plurality of stationary wireless devices associated with the offshore unit.

4. The method of claim 1, wherein tracking, in the database, the locations of the entities in the dimensional map of the offshore unit further comprises receiving visual monitoring from visual devices.

5. The method of claim 1, wherein tracking, in the database, the locations of the entities in the dimensional map of the offshore unit further comprises identifying given ones of the entities as authorized and unauthorized for respective locations in the dimensional map.

6. The method of claim 1, comprises selecting the movable equipment for remote operation from a plurality of movable equipment on the offshore unit.

7. The method of claim 6, wherein selecting the movable equipment for remote operation comprises restricting operation of any additional movable equipment of the plurality of movable equipment for simultaneous operation.

8. The method of claim 1, wherein obtaining the operating parameters of the movable equipment on the offshore unit comprises receiving feedback from the movable equipment and determining dynamic movement of the movable equipment relative to the dimensional map based on the feedback.

9. The method of claim 1, wherein obtaining the operating parameters of the movable equipment operating on the offshore unit further comprises:
receiving visual monitoring at least in a vicinity of the movable equipment operating on the offshore unit; and
determining dynamic movement of the movable equipment relative to the dimensional map from the visual monitoring received.

10. The method of claim 1, wherein detecting, with the programmable control device, the conflict comprises determining that the at least one tracked location of the entity is located at a point-in-time within a boundary of the dynamic zone in the dimensional map.

11. The method of claim 1, wherein outputting the indication comprises generating a perceptible representation of the conflict and outputting the perceptible representation from an interface of the programmable control device to an operator of the movable equipment.

12. The method of claim 1, wherein outputting the indication of the conflict comprises:
generating a control signal in response to the conflict; and
transmitting the control signal to control an operation of the movable equipment.

13. A system, comprising:
a plurality of portable wireless devices associated with entities on an offshore unit;
a plurality of stationary wireless devices associated with the offshore unit;
a database storing a dimensional map of the offshore unit;
a communication interface that when in operation communicates with the plurality of stationary wireless devices and with movable equipment on the offshore unit; and
a programmable control device in communication with database and the communication interface, the programmable control device when in operation:
tracks, in the database, locations of the entities in the dimensional map of the offshore unit by receiving at least wireless monitoring from the portable wireless devices associated with the entities;
obtains dynamic operating parameters of the movable equipment operating on the offshore unit;
calculates a dynamic zone that changes location on the dimensional map by moving dynamically across the dimensional map of the offshore unit with movement of the movable equipment across the offshore unit based on operating parameters of the movable equipment;
detects a conflict of at least one tracked location of an entity from the locations of the entities as interfering with the dynamic zone of the movable equipment; and
outputs an indication of the conflict.

14. The system of claim 13, further comprising a plurality of visual devices associated with the offshore unit, wherein the visual devices communicate with the communication interface.

15. The system of claim 14, wherein the programmable control device when in operation tracks the locations of the entities in the dimensional map of the offshore unit based on visual monitoring transmitted from the visual devices via the communication interface.

16. The system of claim 14, wherein the programmable control device when in operation determines the movement of the movable equipment based on visual monitoring of at least a vicinity of the movable equipment operating on the offshore unit transmitted to the communication interface.

17. The system of claim 13, wherein the programmable control device when in operation receives feedback from the movable equipment.

18. The system of claim 17, wherein programmable control device when in operation calculates the dynamic zone in the dimensional map by:
- determining dynamic movement of the movable equipment relative to the dimensional map based on the feedback, and
- dimensionally translating the dynamic movement of the movable equipment into one or more boundaries of the dynamic zone within the dimensional map.

19. The system of claim 13, wherein the programmable control device outputting the indication of the conflict comprises the programmable control device:
- generating a control signal in response to the conflict; and
- transmitting the control signal to control an operation of the movable equipment.

20. A tangible, non-transitory computer readable medium configured to store instructions executable by a processor to:
- receive first position data associated with a human within a hazardous environment;
- receive second position data representative of a work zone associated with a movable equipment within the hazardous environment;
- compare the first position data to the second position data to detect that the human is within the work zone;
- receive an indication of the movable equipment being commanded to move from a first location in the work zone to a second location in the work zone when the human is within the work zone; and
- in response to detection that the human is within the work zone and the indication of the movable equipment being commanded to move from the first location in the work zone to the second location in the work zone when the human is within the work zone, generate an alert associated with the hazardous environment or generate a control signal to alter movement of the movable equipment.

* * * * *

UNITED STATES PATENT AND TRADEMARK OFFICE
CERTIFICATE OF CORRECTION

| | | |
|---|---|---|
| PATENT NO. | : 12,038,302 B2 | Page 1 of 1 |
| APPLICATION NO. | : 18/143388 | |
| DATED | : July 16, 2024 | |
| INVENTOR(S) | : Agung Atus Sundia et al. | |

It is certified that error appears in the above-identified patent and that said Letters Patent is hereby corrected as shown below:

In the Claims

In Column 19, Line 29 (Line 20 of Claim 1), please delete "machine" and insert -- "equipment" -- therefore.

Signed and Sealed this
Twenty-second Day of October, 2024

Katherine Kelly Vidal
*Director of the United States Patent and Trademark Office*